(12) United States Patent
Kaneko

(10) Patent No.: US 7,456,916 B2
(45) Date of Patent: Nov. 25, 2008

(54) LIQUID CRYSTAL DEVICE WITH OVERCOAT LAYER THAT GRADUALLY REDUCES IN THICKNESS TOWARDS AN EDGE PORTION CORRESPONDING TO A BOUNDARY BETWEEN REFLECTIVE AND TRANSMISSIVE REGIONS

(75) Inventor: Hideki Kaneko, Nagano (JP)

(73) Assignee: Seiko Epson Corporation (JP)

( * ) Notice: Subject to any disclaimer, the term of this patent is extended or adjusted under 35 U.S.C. 154(b) by 331 days.

(21) Appl. No.: 11/201,079

(22) Filed: Aug. 10, 2005

(65) Prior Publication Data

US 2006/0038930 A1 Feb. 23, 2006

(30) Foreign Application Priority Data

Aug. 20, 2004 (JP) ............................. 2004-240738

(51) Int. Cl.
*G02F 1/1335* (2006.01)
(52) U.S. Cl. ...................................... 349/114; 349/113
(58) Field of Classification Search ................. 349/113, 349/114, 115, 156
See application file for complete search history.

(56) References Cited

U.S. PATENT DOCUMENTS 6,750,934 B2 * 6/2004 Sakamoto et al. ........... 349/129
6,822,712 B2 * 11/2004 Suzuki et al. ............... 349/115
7,248,316 B2 * 7/2007 Park ........................... 349/114
2002/0176041 A1 * 11/2002 Hisamitsu et al. ........... 349/115

FOREIGN PATENT DOCUMENTS

| JP | 2000-275660 | 10/2000 |
| JP | 2003-057632 | 2/2003 |
| JP | 2003-222890 | 8/2003 |
| JP | 2003-295165 | 10/2003 |

* cited by examiner

*Primary Examiner*—David Nelms
*Assistant Examiner*—John Heyman
(74) *Attorney, Agent, or Firm*—Harness, Dickey & Pierce, P.L.C.

(57) ABSTRACT

A liquid crystal device includes a device substrate having a switching element, a counter substrate having a color layer, and a liquid crystal layer provided between the device substrate and the counter substrate. The device substrate includes a conductive film connected to the switching element, a scattering layer that covers a part of the conductive film and the switching element, a reflecting layer provided on a part of the scattering layer, an overcoat layer that covers a part of the conductive film, the scattering layer, and the reflecting layer, and a pixel electrode provided on the overcoat layer. The pixel electrode is connected to a contact portion of the conductive film that is not covered with the scattering layer and the overcoat layer.

9 Claims, 17 Drawing Sheets

LIQUID CRYSTAL DEVICE WITH OVERCOAT LAYER THAT GRADUALLY REDUCES IN THICKNESS TOWARDS AN EDGE PORTION CORRESPONDING TO A BOUNDARY BETWEEN REFLECTIVE AND TRANSMISSIVE REGIONS

RELATED APPLICATIONS

This application claims priority to Japanese Patent Application No. 2004-240738 filed Aug. 20, 2004, which is hereby expressly incorporated by reference herein in its entirety.

BACKGROUND OF THE INVENTION

1. Technical Field

The present invention relates to a liquid crystal device that is suitable for use to display various information, and to an electronic apparatus having the liquid crystal device.

2. Related Art

Liquid crystal devices are now widely used in electronic apparatuses such as mobile telephones, portable information terminals, and personal digital assistants (PDAs). For example, liquid crystal devices are used as display sections to display various information about electronic apparatuses. One of the liquid crystal devices is a transflective liquid crystal device which has both a transmissive display mode and a reflective display mode and which includes two-terminal switching elements such as TFDs (thin film diodes). In this liquid crystal device, reflecting films, color filters, and scanning lines are provided on one of two opposing substrates, and data lines, two-terminal switching elements, and pixel electrodes are provided on the other substrate. Liquid crystal is sealed between the substrates.

When reflective display is performed by the liquid crystal device, incident external light passes through a region where the color filters are provided, is reflected by the reflecting films disposed under the color filters, passes again through the color filters, and emerges on a display screen. Consequently, a viewer views a display image having a predetermined hue and a predetermined brightness.

Japanese Unexamined Patent Application Publication No. 2003-57632 discloses a transflective liquid crystal device having a structure that allows a shielding region to be easily formed around an effective display region. A transflective film is provided on a base material of a second substrate, and color filters and so on are provided thereon.

In the liquid crystal device disclosed in this publication, the color filters are provided on the transflective film on one of the substrates. For this reason, when reflective display is performed, the reflectance is decreased by the influence of the refractive index of the color filters, and reflection characteristics, such as reflection contrast, is worsened.

SUMMARY

An advantage of the invention is that it provides a liquid crystal device and an electronic apparatus in which a reflecting film and a color filter are provided on different substrates to improve reflection characteristics and to obtain a high-quality display image.

According to an aspect, the invention provides a liquid crystal device wherein liquid crystal is sealed between a device substrate having a switching element, and a counter substrate having a color layer, wherein the device substrate includes a conductive film connected to the switching element, a scattering layer that covers a part of the conductive film and the switching element, a reflecting layer provided on a part of the scattering layer, an overcoat layer that covers a part of the conductive film, the scattering layer, and the reflecting layer, and a pixel electrode provided on the overcoat layer, and wherein the pixel electrode is connected to a contact portion of the conductive film that is not covered with the scattering layer and the overcoat layer.

In the above liquid crystal device, liquid crystal is sealed between a device substrate having a switching element such as a TFD or a thin film transistor (TFT), and a counter substrate having a color layer. Besides the switching element, the device substrate includes a conductive film, a scattering layer, a reflecting layer, an overcoat layer, and a pixel electrode. The scattering layer covers a part of the conductive film and the switching element. Preferably, the scattering layer is made of an insulating material such as acrylic resin. The reflecting layer is provided on a part of the scattering layer. The overcoat layer covers a part of the conductive film, the scattering layer, and the reflecting layer. Preferably, the overcoat layer is made of an insulating material such as acrylic resin. The pixel electrode is provided on the overcoat layer.

In the liquid crystal device thus configured, the reflecting layer is provided on the device substrate, the color layer is provided on the counter substrate, and the reflecting layer and the color layer are separated from each other. Therefore, it is possible to prevent the reflectance from decreasing in reflective display, and to thereby improve reflection characteristics such as reflection contrast.

The conductive film is connected to the switching element, and the pixel electrode is connected to the contact portion of the conductive film that is not covered with the scattering layer and the overcoat layer. That is, the pixel electrode is electrically connected to the switching element via the contact portion of the conductive film. Since a contact hole for connecting the pixel electrode and the switching element is not provided, the aperture ratio can be increased. Preferably, the switching element is provided on the device substrate so as to be aligned with the reflecting film. This eliminates the necessity of removing a part of the pixel electrode, and thereby increases the aperture ratio.

The liquid crystal device has a so-called overlayer structure in which the pixel electrode is insulated from the data line and the switching element by the scattering layer on the device substrate. Therefore, the pixel electrode can be formed while its right and left edges are disposed as close to adjacent data lines as possible. This also increases the aperture ratio.

Preferably, the device substrate has, in a sub-pixel, a transmissive region near a reflective region where the reflecting layer is provided, and the pixel electrode is provided in the transmissive region. This allows transmissive display to be performed in the transmissive region of the sub-pixel.

Preferably, the scattering layer and the overcoat layer are tapered outside the contact portion of the conductive film, and the conductive film shields light.

In this case, light leakage can be prevented at the tapered portions when the liquid crystal is driven. Preferably, the conductive film is not made of aluminum having a high reflectance, but is made of a material having a low reflectance, for example, chromium. This reduces the amount of light reflected by the conductive film during reflective display, and improves the quality of display images.

Preferably, the conductive film is provided between the transmissive region and the reflective region in the sub-pixel. In this case, switching between the transmissive region and the reflective region is performed at the conductive film in the sub-pixel.

Preferably, a data line is provided on the device substrate and is isolated from the pixel electrode by the scattering layer.

In this case, parasitic capacitance is prevented from being produced between the data line and the pixel electrode, and so-called longitudinal crosstalk is prevented. Longitudinal crosstalk is a phenomenon in which, when a monochrome rectangle of red, blue, or green, or a rectangle of any of cyan, magenta, and yellow, which are complementary to red, blue, and green, is displayed on, for example, a gray background, portions of the background disposed on the upper and lower sides of the rectangle are displayed in a color lighter than its original color, and are also slightly hued.

Preferably, a columnar photospacer is provided on the counter substrate correspondingly to the reflective region when the device substrate and the counter substrate are bonded, and the thickness of the liquid crystal layer in the reflective region is smaller than in the transmissive region.

In this case, a columnar photospacer is formed on the counter substrate by, for example, photolithography. The photospacer is provided correspondingly to the reflective region where reflective display is performed in a state in which the device substrate and the counter substrate are bonded. Consequently, the thickness of the liquid crystal layer in the reflective region is smaller than in the transmissive region where transmissive display is performed. That is, the liquid crystal device has a multigap structure in which the thickness of the liquid crystal layer is optimized in both the reflective region and the transmissive region. Accordingly, a high-quality display image can be obtained in both transmissive display and reflective display.

According to another aspect, the invention provides an electronic apparatus having the above liquid crystal device as a display section.

BRIEF DESCRIPTION OF THE DRAWINGS

The invention will be described with reference to the accompanying drawings, wherein like numbers reference like elements, and wherein:

FIG. 8 is a cross-sectional view of one sub-pixel including a reflective display region, a transmissive display region, and so on;

DESCRIPTION OF THE EMBODIMENTS

A preferred embodiment of the invention will be described below with reference to the drawings. In this embodiment, the invention is applied to a liquid crystal display device. For example, a reflecting layer and a multigap are provided on a device substrate, and a color layer is provided on a color filter substrate serving as a counter substrate, thereby improving reflection characteristics such as reflection contrast. Moreover, the device substrate has a so-called overlayer structure in order to increase the aperture ratio and to prevent longitudinal crosstalk. High-quality display images can be thereby obtained.

[Configuration of Liquid Crystal Display Device 100]

Figure 1:
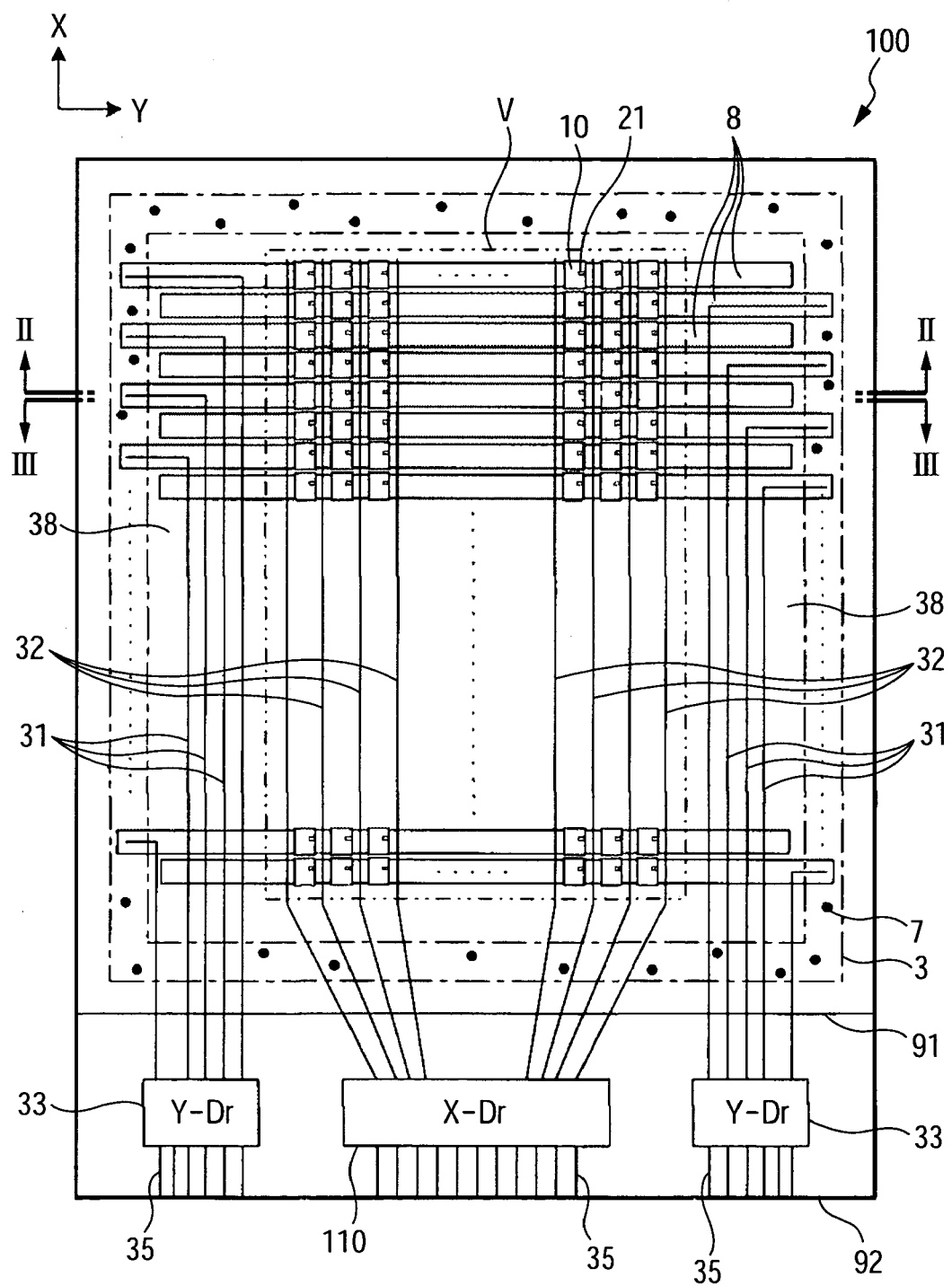
FIG. 1 is a plan view showing the arrangement of electrodes and lines in a liquid crystal display device according to an embodiment of the invention.

A description will be first given of the configuration of a liquid crystal display device according to an embodiment of the invention. FIG. 1 is a plan view schematically showing the configuration of a liquid crystal display device 100 according to the embodiment. FIG. 1 mainly shows the arrangement of electrodes and lines in the liquid crystal display device 100. The liquid crystal display device 100 is an active-matrix transflective liquid crystal display device using TFDs. The liquid crystal display device 100 has a so-called multigap structure in which the thickness of a liquid crystal layer in a reflective display region is smaller than in a transmissive display region, and which can enhance display performance in both transmissive display and reflective display. The liquid crystal display device 100 also has a so-called overlayer structure in which a pixel electrode is insulated from a data line and a TFD by a resin scattering layer.

Figure 2:
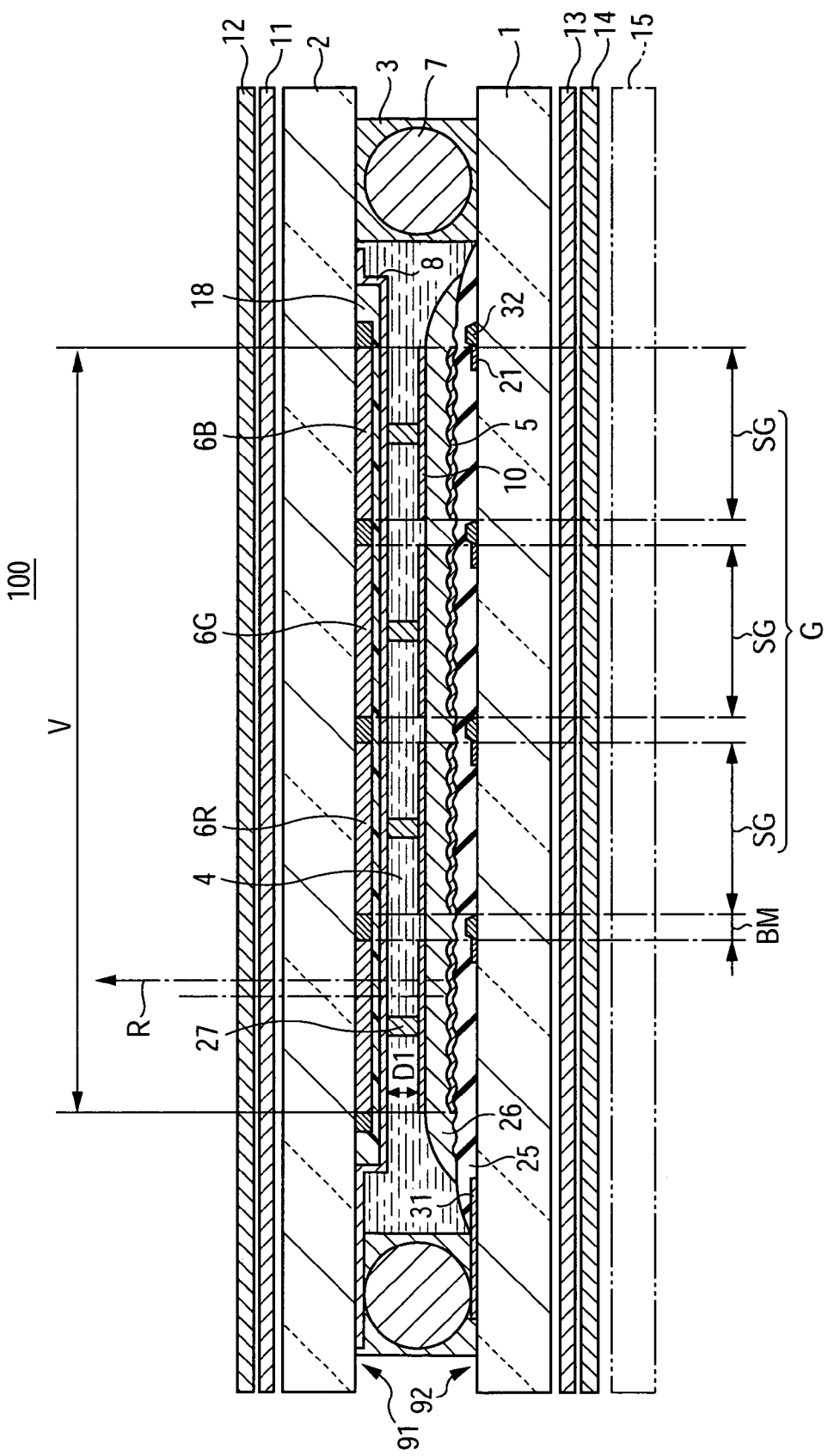
FIG. 2 is a cross-sectional view corresponding to a reflective display region in the liquid crystal display device.
Figure 3:
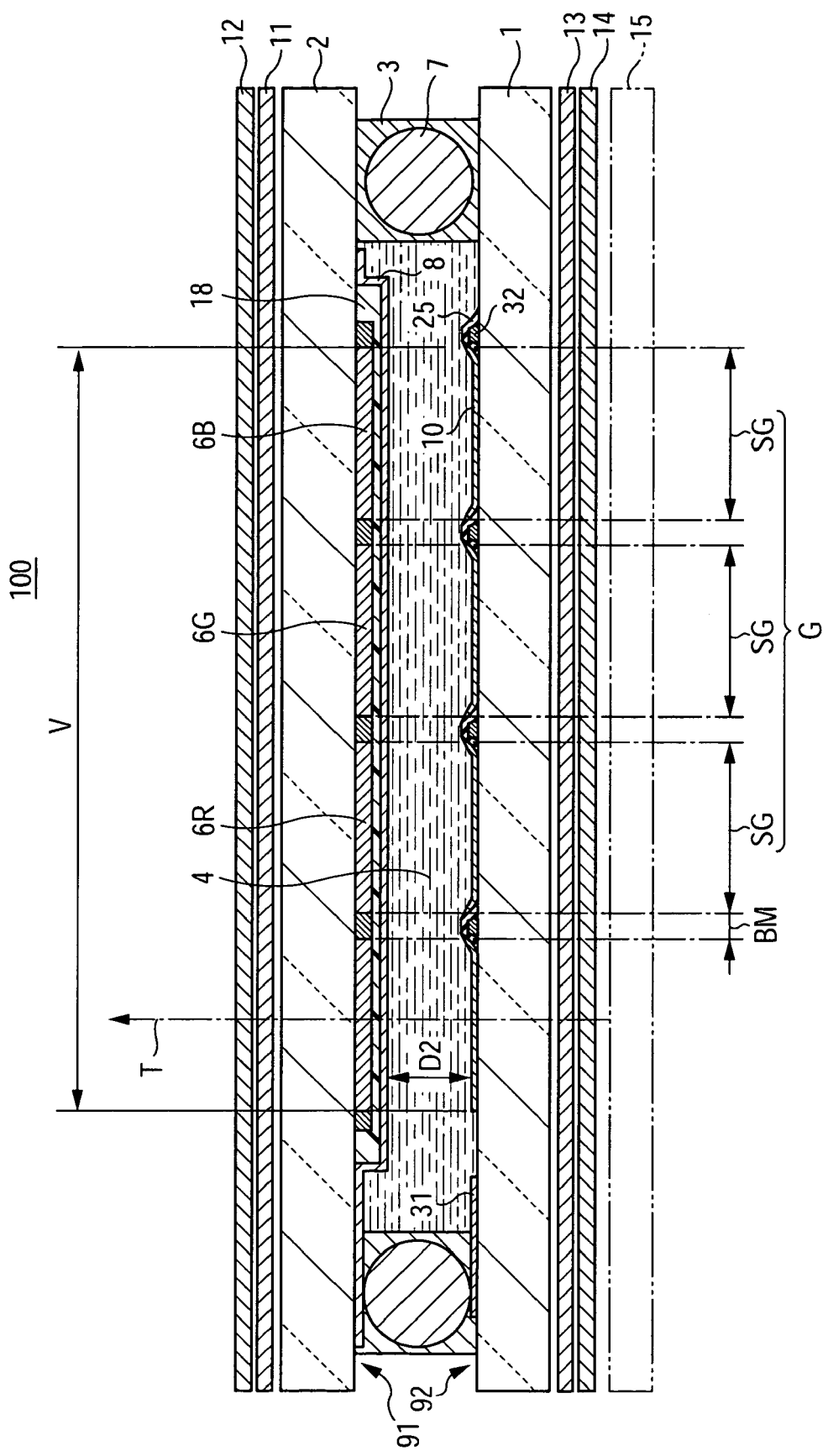
FIG. 3 is a cross-sectional view corresponding to a transmissive display region in the liquid crystal display device.

FIG. 2 is a schematic cross-sectional view of the liquid crystal display device 100, taken along line II-II passing through reflective display regions of a plurality of pixel electrodes arranged in a row. FIG. 3 is a schematic cross-sectional view of the liquid crystal display device 100, taken along line III-III passing through transmissive display regions of a plurality of pixel electrodes arranged in a row.

The cross-sectional configurations of the liquid crystal display device 100 along the lines II-II and III-III will be first described with reference to FIGS. 2 and 3, and the arrangement of electrodes and lines in the liquid crystal display device 100 will be then described.

Referring to FIG. 2, in the liquid crystal display device 100, a device substrate 92 is bonded to an opposing color filter substrate 91 with a frame-shaped seal member 3 disposed therebetween, and liquid crystal is sealed in an area surrounded by the seal member 3 to form a liquid crystal layer 4. A plurality of conductive materials 7, such as gold particles, are mixed in the seal member 3.

On an inner surface of a lower substrate 1, data lines 32 are provided at appropriate intervals, and TFDs 21 are provided correspondingly to sub-pixels SG. A resin scattering layer 25 having fine surface irregularities is provided on the inner surfaces of the lower substrate 1, the data lines 32, and the TFDs 21. The resin scattering layer 25 is preferably made of an insulating and light-transmissive material such as acrylic resin. Reflecting layers 5 are provided on an inner surface of the resin scattering layer 25 correspondingly to the sub-pixels SG. Inner surfaces of the reflecting layers 5 have fine irregularities that reflect the fine irregularities of the resin scattering layer 25. Each reflecting layer 5 is a thin film made of, for example, aluminum, an aluminum alloy, or a silver alloy.

An overcoat layer 26 is provided on the inner surfaces of the resin scattering layer 25 and the reflecting layers 5. The overcoat layer 26 serves to protect the reflecting layers 5 and so on from, for example, corrosion and contamination by agents used during a production process of the liquid crystal display device 100. Pixel electrodes 10 are provided on an inner surface of the overcoat layer 26 correspondingly to the sub-pixels SG. An alignment film (not shown) is provided on the inner surfaces of the pixel electrodes 10 and so on.

Scanning lines 31 are provided at the right and left edges of the inner surface of the lower substrate 1. One-end portions of the scanning lines 31 extend into the seal member 3 so as to be electrically connected to the conductive materials 7 in the seal member 3.

Color layers 6R, 6G, and 6B of three colors R, G, and B are provided on an inner surface of an upper substrate 2 correspondingly to the sub-pixels SG so as to oppose the pixel electrodes 10. The color layers 6R, 6G, and 6B constitute a color filter. A pixel G represents one color pixel defined by R, G, and B sub-pixels SG. In the following description, depending on whether or not the color is to be considered, for example, "a color layer 6" and "a color layer 6R" are selectively used.

Black shielding layers BM are provided between the sub-pixels SG to separate adjacent sub-pixels SG and to prevent light from a sub-pixel SG from being mixed into another sub-pixel SG. The black shielding layers BM may be made of a black resin material, for example, a resin material in which black pigment is dispersed. In the invention, the black shielding layers BM may be replaced with laminate shielding layers (not shown) that are formed by laminates of R, G, and B color layers.

An overcoat layer 18 made of, for example, acrylic resin is provided on inner surfaces of the color layers 6 and the black shielding layers BM. The overcoat layer 18 serves to protect the color layers 6 and so on from corrosion and contamination by agents used during the production process of the liquid crystal display device 100. Transparent electrodes (scanning electrodes) 8 made of, for example, ITO (indium-tin oxide) are arranged in stripes on an inner surface of the overcoat layer 18. One-end portions of the transparent electrodes 8 extend into the seal member 3 so as to be electrically connected to the conductive materials 7 in the seal member 3.

An alignment film (not shown) is provided on inner surfaces of the transparent electrodes 8. Columnar photospacers 27 formed by, for example, photolithography are also provided on the inner surfaces of the transparent electrodes 8. The photospacers 27 maintain a fixed thickness D1 of the liquid crystal layer 4 in a reflective display region. The photospacers 27 are preferably made of a photosensitive and thermosetting resin material such as an acrylic film or a polyimide film, or an inorganic material such as a silicon oxide film or a silicon nitride film.

A retardation film (quarter-wave plate) 13 and a polarizing plate 14 are provided on an outer surface of the lower substrate 1, and a retardation film (quarter-wave plate) 11 and a polarizing plate 12 are provided on an outer surface of the upper substrate 2. A backlight 15 is provided below the polarizing plate 14. Preferably, the backlight 15 is, for example, a point light source such as an LED (light emitting diode), or a line light source such as a cold-cathode fluorescent tube.

The scanning lines 31 on the lower substrate 1 are electrically connected to the transparent electrodes 8 on the upper substrate 2, that is, scanning lines on the upper substrate 2 via the conductive materials 7 mixed in the seal member 3.

When reflective display is performed by the liquid crystal display device 100 of this embodiment, external light travels along a path R shown in FIG. 2 after entering the liquid crystal display device 100. That is, the external light is reflected by the reflecting layers 5, and then reaches a viewer. In this case, the external light passes through a region in which the color layers 6, the pixel electrodes 10, and the overcoat layer 26 are provided, is reflected by the reflecting layers 5 disposed under the overcoat layer 26, passes again through the overcoat layer 26, the pixel electrodes 10, and the color layers 6, and is thereby given a predetermined hue and a predetermined brightness. In this way, a desired color display image is viewed by the viewer.

The cross-sectional configuration of the liquid crystal display device 100 along line III-III in FIG. 1 will be described with reference to FIG. 3. In the following, descriptions of components similar to those in FIG. 2 are omitted or simplified.

Referring to FIG. 3, data lines 32 are provided at appropriate intervals on the inner surface of the lower substrate 1. Resin scattering layers 25 are provided on the inner surface of the lower substrate 1 adjacent to the right and left edges of the data lines 32 and on the inner surfaces of the data lines 32. That is, the data lines 32 are covered with the resin scattering layers 25. Pixel electrodes 10 are also provided on the inner surface of the lower substrate 1 correspondingly to sub-pixels SG, and the right and left edges of the pixel electrodes 10 are provided on the inner surfaces at the right and left edges of the resin scattering layers 25. Other components provided or mounted on the lower substrate 1 are similar to those shown in FIG. 2, and descriptions thereof are omitted.

Color layers 6R, 6G, and 6B are provided on the inner surface of the upper substrate 2 correspondingly to the sub-pixels SG so as to oppose the pixel electrodes 10. Black shielding layers BM are provided between the sub-pixels SG so as to oppose the data lines 32. An overcoat layer 18 made of, for example, acrylic resin is provided on the inner surfaces of the color layers 6 and the black shielding layers BM. Transparent electrodes 8 are provided on an inner surface of the overcoat layer 18. Other components provided on the upper substrate 2 are similar to those shown in FIG. 2, and descriptions thereof are omitted.

When transmissive display is performed by the liquid crystal display device 100 of this embodiment, illumination light emitted from the backlight 15 travels along a path T shown in FIG. 3, and reaches the viewer through the pixel electrodes 10 and the color layers 6. In this case, the illumination light is given a predetermined hue and a predetermined brightness by passing through the color layers 6. In this way, a desired color display image is viewed by the viewer.

Figure 4:
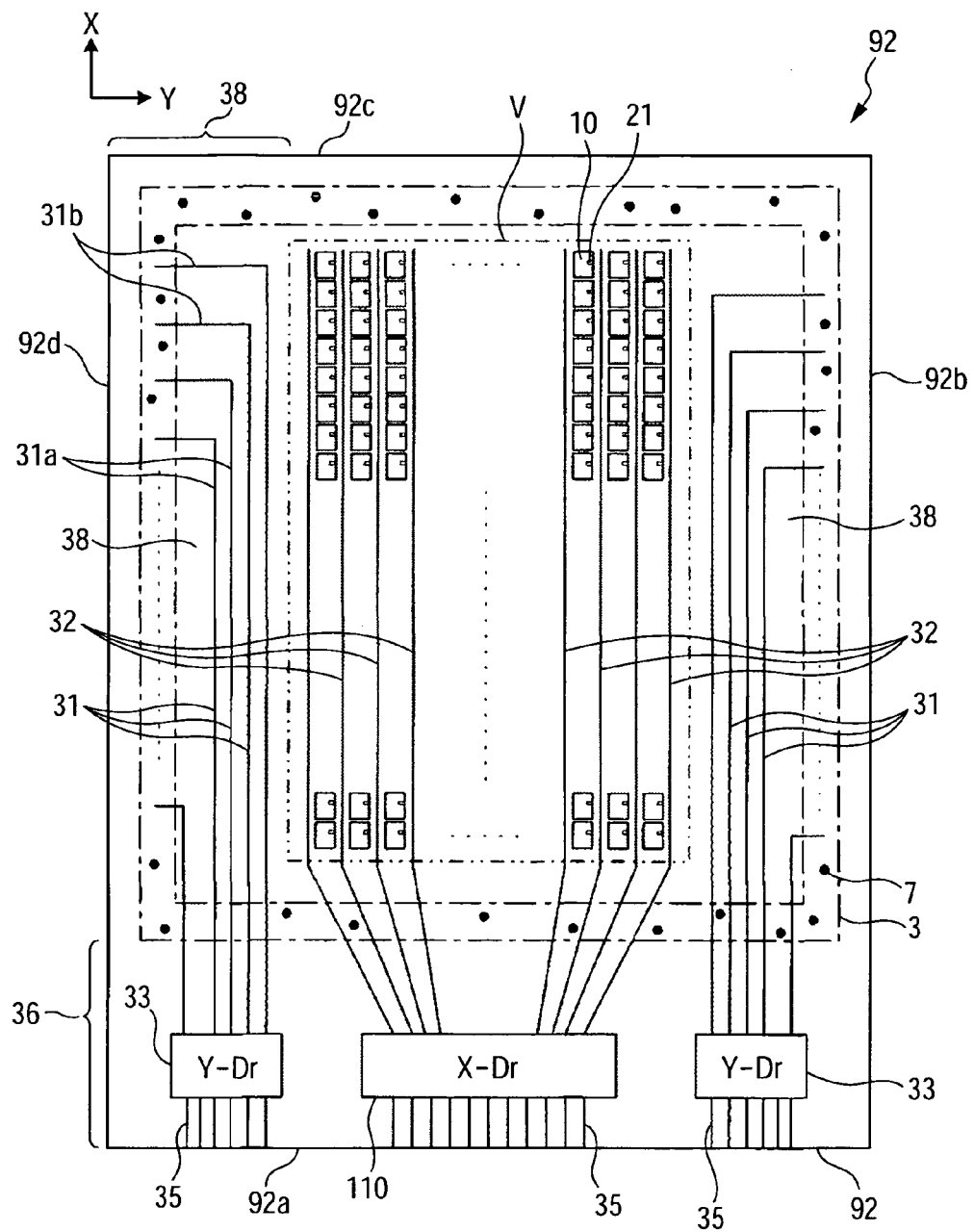
FIG. 4 is a plan view showing the arrangement of electrodes and lines on a device substrate of the liquid crystal display device.
Figure 5:
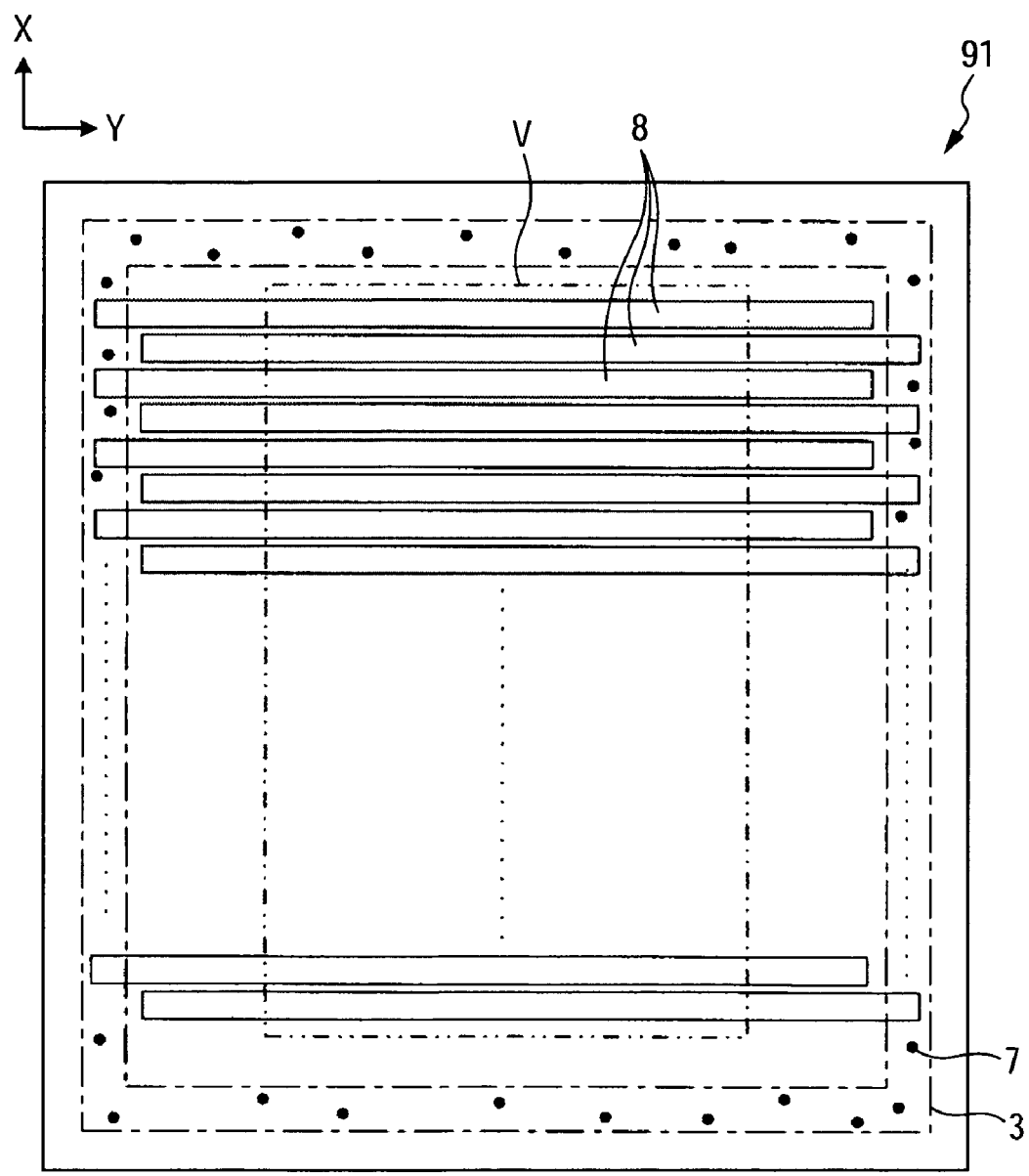
FIG. 5 is a plan view showing the arrangement of electrodes on a color filter substrate of the liquid crystal display device.

The arrangement of electrodes and lines on the device substrate 92 and the color filter substrate 91 will now be described with reference to FIGS. 1, 4, and 5. FIG. 4 is a plan view showing the arrangement of electrodes and lines on the device substrate 92, as viewed from the front side (that is, from the upper side in FIGS. 2 and 3). FIG. 5 is a plan view showing the arrangement of electrodes and lines on the color filter substrate 91, as viewed from the front side (that is, from the lower side in FIGS. 2 and 3). For convenience of explanation, components other than electrodes and lines are not shown in FIGS. 4 and 5.

In FIG. 1, the pixel electrodes 10 of the device substrate 92 and the transparent electrodes 8 of the color filter substrate 91 intersect to define sub-pixels SG serving as the smallest units. A plurality of sub-pixels SG are arranged in a matrix, that is, in the longitudinal and lateral directions of the plane of the figure, thereby forming an effective display region V (a region enclosed by a two-dot chain line). Images, such as characters, numerals, and figures, are displayed in the effective display region V. In FIGS. 1 and 4, a frame region 38 that is not used for image display is defined between the outer periphery of the liquid crystal display device 100 and the effective display region V.

(Arrangement of Electrodes and Lines)

The arrangement of electrodes and lines on the device substrate 92 will be first described with reference to FIG. 4. The device substrate 92 includes TFDs 21, pixel electrodes 10, scanning lines 31, data lines 32, Y-driver ICs 33, an X-driver IC 110, and external-connection terminals 35.

The Y-driver ICs 33 and the X-driver IC 110 are mounted on an extended portion 36 of the device substrate 92 with, for example, an ACF (anisotropic conductive film) disposed therebetween. In FIG. 4, a direction from a side 92a of the device substrate 92 at the extended portion 36 to an opposite side 92c is designated as the X-direction, and a direction from a side 92d to a side 92b is designated as the Y-direction.

A plurality of external-connection terminals 35 are provided on the extended portion 36. The external-connection terminals 35 are connected to input terminals (not shown) of the Y-driver ICs 33 and the X-driver IC 110 via conductive bumps, and are also connected to an unshown wiring board, such as a flexible printed circuit board, via an ACF, solder, or the like. This allows signals and power to be supplied from an electronic apparatus, such as a mobile telephone or an information terminal, to the liquid crystal display device 100.

Output terminals (not shown) of the X-driver IC 110 are connected to a plurality of data lines 32 via conductive bumps. Output terminals (not shown) of the Y-driver ICs 33 are connected to a plurality of scanning lines 31 via conductive bumps. Accordingly, the X-driver IC 110 outputs data signals to the data lines 32, and the Y-driver ICs 33 output scanning signals to the scanning lines 31.

The data lines 32 linearly extend from the extended portion 36 to the effective display region V in the longitudinal direction of the plane of the figure, that is, in the X-direction. The data lines 32 are arranged at fixed intervals, and are connected to a plurality of TFDs 21 with an appropriate space therebetween. The TFDs 21 are connected to corresponding pixel electrodes 10 via shielding conductive films (not shown) serving as contact portions.

Each of the scanning lines 31 includes a main portion 31a, and a bent portion 31b extending almost at right angles to the main portion 31a. The main portions 31a extend in the X-direction from the extended portion 36 into the frame region 38, and are arranged almost parallel to and at a fixed distance from the data lines 32. The bent portions 31b extend in the Y-direction in the frame region 38 to reach the seal member 3 disposed on the right and left sides of the device substrate 92, and one-end portions of the bent portions 31b are connected to the conductive materials 7 in the seal member 3.

The arrangement of electrodes on the color filter substrate 91 will now be described. As shown in FIG. 5, transparent electrodes 8 extend in stripes in the Y-direction on the color filter substrate 91. Right and left ends of the transparent electrodes 8 are disposed in the seal member 3 so as to be connected to the conductive materials 7 in the seal member 3, as shown in FIGS. 1 and 5.

FIG. 1 shows a state in which the color filter substrate 91 and the device substrate 92 described above are bonded with the seal member 3 disposed therebetween. As shown in FIG. 1, the transparent electrodes 8 of the color filter substrate 91 intersect the data lines 32 of the device substrate 92, and are placed on rows of pixel electrodes 10. The transparent electrodes 8 and the pixel electrodes 10 are thus placed one on another to define sub-pixels SG.

The transparent electrodes 8 of the color filter substrate 91 (scanning lines of the color filter substrate 91) are alternately placed on the scanning lines 31 of the device substrate 92 on the right and left sides of the liquid crystal display device 100, and are electrically connected thereto via the conductive materials 7 in the seal member 3, as shown in FIG. 1. That is, conduction between the scanning lines (transparent electrodes 8) of the color filter substrate 91 and the scanning lines 31 of the device substrate 92 is established in an alternating manner between the right and left sides. Accordingly, the transparent electrodes 8 are electrically connected to the right and left Y-driver ICs 33 via the scanning lines 31.

[Structure of Device Substrate 92]

Figure 6:
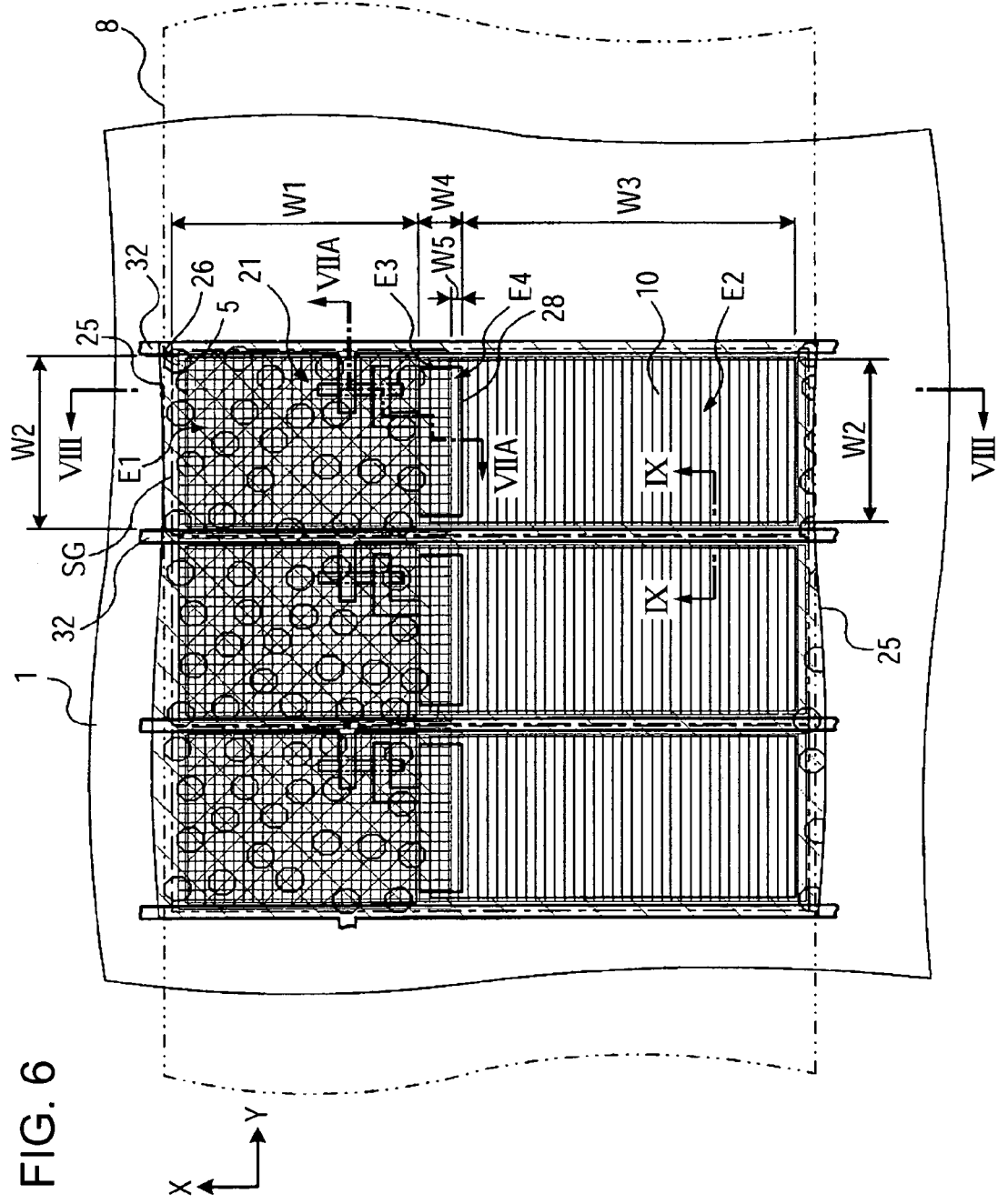
FIG. 6 is a partial plan view showing the arrangement of a plurality of pixel electrodes on the device substrate.

The structure of the device substrate 92, which is a characteristic part of the invention, will now be described with reference to FIGS. 6 to 8. FIG. 6 is a partial plan view showing the layout in one pixel on the device substrate 92, as viewed from the upper side in FIGS. 2 and 3. In FIG. 6, areas provided between the data lines 32 so as to oppose the transparent electrodes 8 of the color filter substrate 91 are sub-pixels SG (areas surrounded by one-dot chain lines). Each of the sub-pixels SG includes a reflective display region E1, a transmissive display region E2, and a shielding region E3. The reflective display region E1 is shaped like a rectangle having an X-direction length W1 and a Y-direction length W2, and is used to perform reflective display. The shielding region E3 is not used for image display, and is shaped like a rectangle having an X-direction length W4 and a Y-direction length W2. The shielding region E3 includes a contact region E4 having an X-direction length W5 and a Y-direction length W2. The transmissive display region E2 is used to perform transparent display, and has an X-direction length W3 and a Y-direction length W2.

Referring to FIG. 6, on the lower substrate 1, linear data lines 32 extend in the X-direction and at appropriate intervals, TFDs 21 are provided in the respective reflective display regions E1, and rectangular shielding conductive films 28 made of, for example, chromium are provided in the respective shielding regions E3. Each of the shielding conductive films 28 mainly serves to prevent light leakage from a resin scattering layer 25 and an overcoat layer 26 provided thereon in a tapered shape. The data lines 32, the TFDs 21, and the shielding conductive films 28 are electrically connected.

Figure 7A:
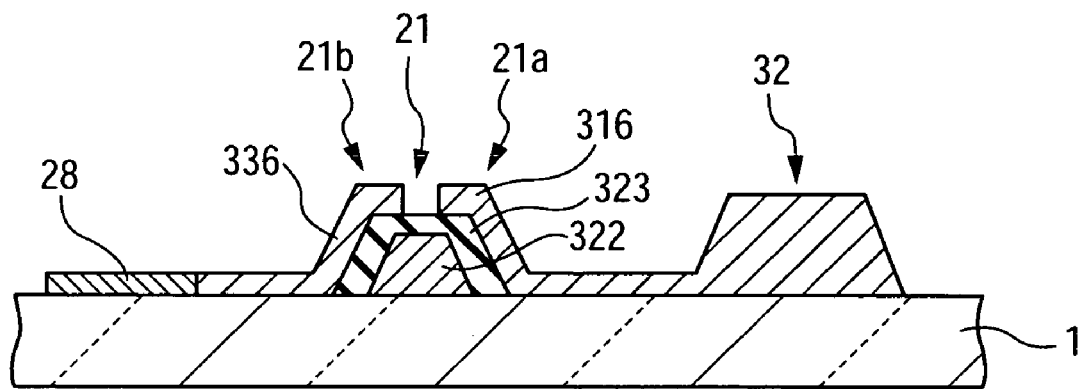
FIGS. 7A and 7B are enlarged sectional views showing the structure of a TFD provided on the device substrate.

Structures of the data lines 32, the TFDs 21, and the shielding conductive films 28 will now be described with reference to FIG. 7A. FIG. 7A is a cross-sectional view, taken along line VIIA-VIIA in FIG. 6. For convenience, components provided on the inner surfaces of the data lines 32, the TFDs 21, and the shielding conductive films 28, and components provided or mounted on the outer surface of the lower substrate 1 are not shown in FIG. 7A.

As shown in FIG. 7A, each TFD 21 includes a first TFD element 21a and a second TFD element 21b. The first and second TFD elements 21a and 21b include a first metal film 322 shaped like an island and made of, for example, TaW (tantalum tungsten), an insulating film 323 formed by anodizing the surface of the first metal film 322 and made of, for example, $Ta_2O_5$, and second metal films 316 and 336 separately provided on the surface of the insulating film 323. The second metal films 316 and 336 are formed by patterning the same conductive film made of chromium or the like. The second metal film 316 diverges from the data line 32 in a T-shape, and the second metal film 336 is connected to the shielding conductive film 28.

The first TFD element 21a has a metal/insulator/metal structure in which the second metal film 316, the insulating film 323, and the first metal film 322 are arranged in that order from the side of the data line 32, and therefore, the current-voltage characteristic thereof is nonlinear in both the positive and negative directions. In contrast, the second TFD element 21b has the reverse of the structure of the first TFD element 21a, that is, the first metal film 322, the insulating film 323, and the second metal film 336 are arranged in that order from the side of the data line 32. For this reason, the current-voltage characteristic of the second TFD element 21b is point-symmetrical with that of the first TFD element 21a with respect to the origin. Since the TFD 21 includes two TFD elements oriented in opposite directions and connected in series, the nonlinear current-voltage characteristic is made symmetrical in both the positive and negative directions in contrast to a case in which a single TFD element is used. As described above, the data line 32, the TFD 21, and the shielding conductive film 28 are electrically connected.

Figure 7B:
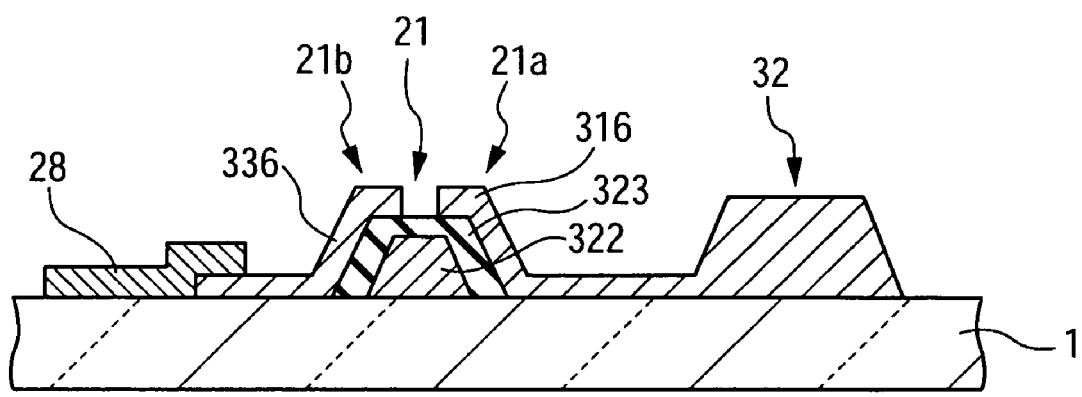

As shown in FIG. 7A, a part of the second metal film 336 of the TFD 21 and the shielding conductive film 28 are provided on the lower substrate 1, and are flush with each other. Alternatively, the second metal film 336 and the shielding conductive film 28 may be provided so as not to be flush with each other. That is, as shown in FIG. 7B, the shielding conductive film 28 may be provided on a part of the second metal film 336 and a portion of the lower substrate 1 adjacent thereto so as to overlap with the part of the second metal film 336. The structure shown in FIG. 7A allows the second metal film 336 and the shielding conductive film 28 to be produced in the same process. In contrast, when the structure shown in FIG. 7B is adopted, the shielding conductive film 28 need to be formed after the second metal film 336 is formed on the lower substrate 1. Accordingly, the structure shown in FIG. 7A is more desirable than the structure shown in FIG. 7B in order to reduce the number of production steps.

Referring again to FIG. 6 as a plan view, various components are provided on the lower substrate 1, the data lines 32, the TFDs 21, and the shielding conductive films 28. For easy understanding, the layered structure will be described with reference to FIG. 8 as a cross-sectional view. FIG. 8 is a cross-sectional view taken along line VIII-VIII in FIG. 6, and more specifically, a cross-sectional view of one sub-pixel SG taken in the X-direction. For convenience of explanation, FIG. 8 also shows the cross-section of the color filter substrate 91 opposing the device substrate 92.

A retardation film 13, a polarizing plate 14, and a backlight 15 are provided on the outer surface of the lower substrate 1. A TFD 21, a shielding conductive film 28, a resin scattering layer 25, and a pixel electrode 10 are provided on the inner surface of the lower substrate 1.

More specifically, on the lower substrate 1, a TFD 21 is provided in a reflective display region E1, and a shielding conductive film 28 is provided in a shielding region E3. A resin scattering layer 25 having fine surface irregularities is provided on a portion of the lower substrate 1 opposing a black shielding layer BM, on a portion of the lower substrate 1 and the TFD 21 in the reflective display region E1, and on a part of the shielding conductive film 28. At least a peripheral portion of the resin scattering layer 25 disposed on the shielding conductive film 28 is tapered. In order to maintain a fixed thickness D1 of a liquid crystal layer 4 in the reflective display region E1, it is preferable that the resin scattering layer 25 be approximately 1.2 µm to 1.3 µm in thickness. A reflecting layer 5 that reflects the fine irregularities of the resin scattering layer 25 is provided on the resin scattering layer 25 in the reflective display region E1. For this reason, in reflective display, external light is reflected while moderately scattering because of the irregularities of the reflecting layer 5, and therefore, uniformly reflected light is obtained. An overcoat layer 26 is provided on the resin scattering layer 25, the reflecting layer 5, and a part of the shielding conductive film 28. At least a peripheral portion of the overcoat layer 26 disposed on the shielding conductive film 28 is tapered. The resin scattering layer 25 and the overcoat layer 26 are not provided on the other part of the shielding conductive film 28 adjacent to the transmissive display region E2 (hereinafter also referred to as a "contact region E4") because the other part is connected to a pixel electrode 10.

The pixel electrode 10 is provided inside the sub-pixel SG. More specifically, the pixel electrode 10 is provided on the lower substrate 1 in the transmissive display region E2, on the contact region E4, on a portion of the overcoat layer 26 in a part of the shielding region E3, and on a portion of the overcoat layer 26 in the reflective display region E1. Consequently, the pixel electrode 10 is electrically connected to the shielding conductive film 28 made of, for example, chromium in the contact region E4, and is electrically connected to the data line 32 and the TFD 21 via the shielding conductive film 28.

A description will be given of the structures of one sub-pixel SG on the device substrate 92 and the color filter substrate 91 opposing the sub-pixel SG, and the positional relationship with the components.

A retardation film 11 and a polarizing plate 12 are provided on the outer surface of the upper substrate 2, and a color layer 6 and a black shielding layer BM are provided on the inner surface thereof. More specifically, the color layer 6 opposes the pixel electrode 10, and the black shielding layer BM is provided on the periphery of the pixel electrode 10, in other words, outside the sub-pixel SG. An overcoat layer 18 is provided on the inner surfaces of the color layer 6 and the black shielding layer BM, and a transparent electrode 8 is provided on the overcoat layer 18. A photospacer 27 is provided on an inner surface of the transparent electrode 8 in the reflective display region E1.

In a state in which the device substrate 92 and the color filter substrate 91 are bonded with the seal member 3 (see FIGS. 2 and 3) disposed therebetween, the thickness of the liquid crystal layer 4 is fixed by the photospacer 27. More specifically, the liquid crystal layer 4 has a fixed thickness D1 in the reflective display region E1, and a fixed thickness D2 (>D1) in the transmissive display region E2, thus forming a multigap structure.

In one sub-pixel SG having the above-described structure, transmissive display is performed in the transmissive display region E2, and reflective display is performed in the reflective display region E1. Since the shielding conductive film 28 is made of a shielding material such as chromium, display is not performed in the shielding region E3 where the shielding conductive film 28 is provided. In general, light leakage, for example, due to abnormal alignment of liquid crystal may occur in the region, such as the shielding region E3, where the resin scattering layer 25 and the overcoat layer 26 are tapered. Since such tapered portions are provided on the shielding conductive film 28 in this embodiment, light leakage can be prevented. Although edges of the reflecting layer easily peel off in general, the reflecting layer 5 in this embodiment is covered with the overcoat layer 26, and therefore, is prevented from peeling off.

Figure 9:
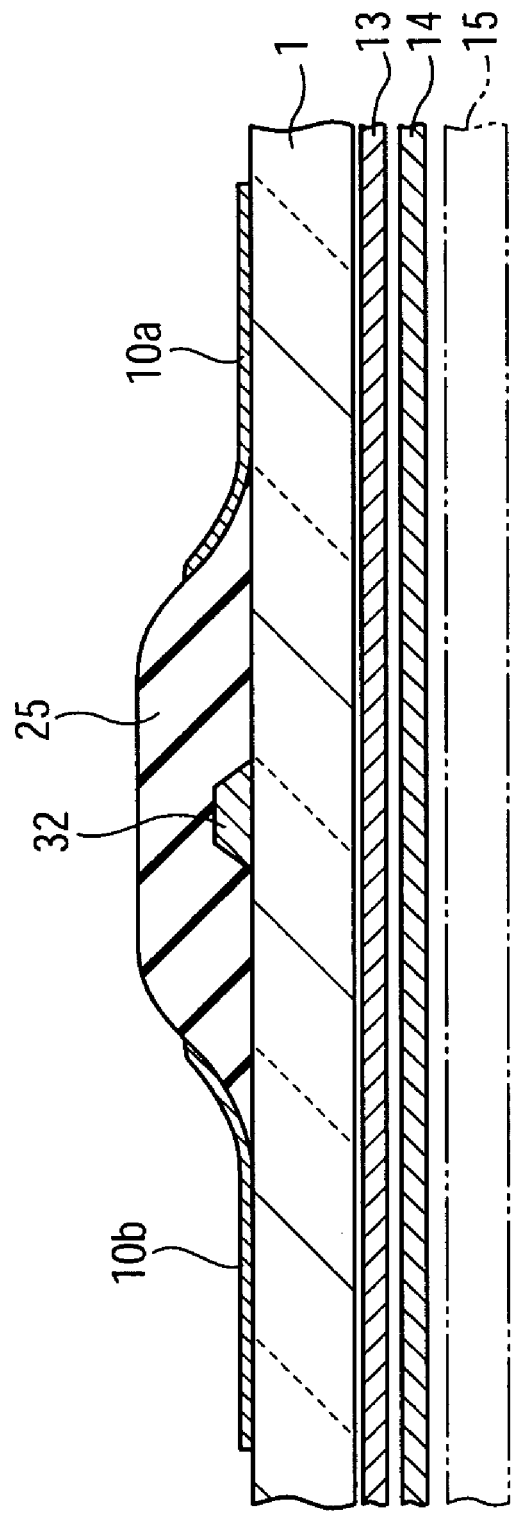
FIG. 9 is a cross-sectional view showing a data line and its surroundings on the device substrate.

The layered structure of the cross section taken along line IX-IX in FIG. 6 will be described with reference to FIG. 9. FIG. 9 shows the cross-sectional structure of a data line 32 and its surroundings.

The data line 32 is provided on the inner surface of the lower substrate 1. A resin scattering layer 25 is provided on the data line 32 and on a portion of the lower substrate 1 near the right and left edges of the data line 32. That is, the data line 32 is covered with the resin scattering layer 25. A left edge of a pixel electrode 10a and a right edge of a pixel electrode 10b disposed on a side of the data line 32 opposite the pixel electrode 10a are provided on the right and left edges of the resin scattering layer 25 in this area. Therefore, the pixel electrodes 10a and 10b are insulated from the data line 32 by the resin scattering layer 25.

Operational advantages of the liquid crystal display device 100 having the device substrate 92 according to the embodiment will be described with appropriate reference to the drawings.

As a comparative example, in a liquid crystal display device having a device substrate in which a color layer is provided on a reflecting layer, external light travels along the following path in reflective display after entering the liquid crystal display device. The external light passes through the color layer and so on, is reflected by the reflecting layer disposed under the color layer, passes again through the color layer, and reaches the viewer. However, when the external light travels along this path, for example, the reflectance is decreased by the influence of the refractive index of the color layer (in other words, the light utilizing efficiency is decreased). This worsens reflection characteristics such as reflection contrast.

In contrast, in the liquid crystal display device 100 of the embodiment, since the reflecting layer 5 is provided on the device substrate 92, and the color layer 6 is provided on the color filter substrate 91, the reflecting layer 5 and the color layer 6 are separated from each other. For this reason, even when external light travels along the path R shown in FIGS. 2 and 3 in reflective display, the reflective index for the light is rarely changed by the color layer 6, and the reflectance can be prevented from decreasing. Consequently, reflection characteristics, such as reflection contrast, can be improved.

Figure 8:
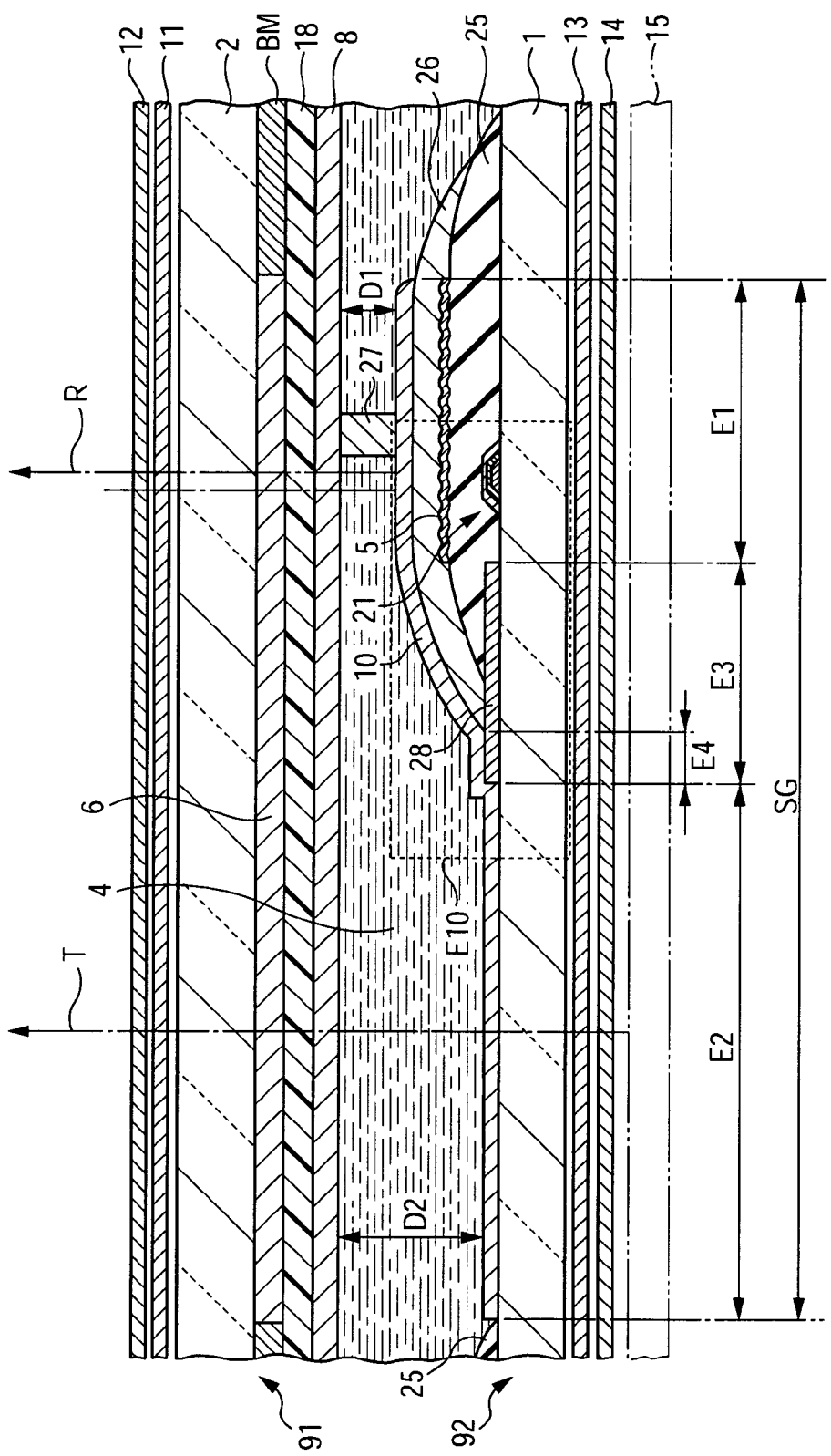

As shown in FIGS. 2, 8, and 9, the pixel electrode 10 and the data line 32 are insulated by the resin scattering layer 25 on the device substrate 92. In other words, the device substrate 92 has a so-called overlayer structure. This prevents parasitic capacitance from being produced between the pixel electrode 10 and the data line 32, and thereby prevents longitudinal crosstalk. In the above structure, the pixel electrodes 10 can be provided with their right and left edges disposed as close to adjacent data lines 32 as possible. Consequently, the aperture ratio is increased.

In a liquid crystal display device having a so-called overlayer structure as another comparative example, an insulating layer (corresponding to the resin scattering layer 25 and the overcoat layer 26 in the invention) has contact holes, and pixel electrodes, data lines, and TFDs are electrically connected at the contact holes. In this case, the aperture ratio is decreased by an amount corresponding to the areas of the contact holes.

In contrast, in the liquid crystal display device 100 of the embodiment, particularly, in the device substrate 92, the pixel electrode 10 and the contact region E4 (corresponding to the shielding conductive film 28) are connected by effectively utilizing the tapered portions of the resin scattering layer 25 and the overcoat layer 26 in the shielding region E3 (multigap tapered shielding region), as shown in FIG. 8. The pixel electrode 10, the data line 32, and the TFD 21 are thereby connected electrically. Since contact holes are not provided, unlike the above comparative example, a high aperture ratio is ensured.

In a liquid crystal display device having TFDs as a further comparative example, in general, a pixel electrode is partly removed, and is electrically connected to a data line via a TFD disposed in the removed part of the pixel electrode.

In contrast, in the liquid crystal display device 100 of the embodiment, the TFD 21 is provided below the reflecting layer 5 in the device substrate 92. Therefore, it is unnecessary to partly remove the pixel electrode 10, and this increases the aperture ratio.

In the device substrate 92, the shielding conductive film 28 is provided under the tapered portions of the resin scattering layer 25 and the overcoat layer 26 in the shielding region E3 (multigap tapered shielding region). This prevents light leakage in the shielding region E3, and ensures a high-quality display image.

The shielding conductive film 28 provided in the shielding region E3 is not made of aluminum having a high reflectance, but is made of a low-reflectance material, for example, chromium. Therefore, the amount of light reflected by the shielding conductive film 28 is reduced in reflective display, and a high-quality display image is ensured.

The resin scattering layer 25 and the overcoat layer 26 are provided in the reflective display region E1, but are not provided in the transmissive display region E2. Therefore, the fixed thickness D1 of the liquid crystal layer 4 is maintained in the reflective display region E1, and the fixed thickness D2 (>D1) is maintained in the transmissive display region E2. That is, the liquid crystal display device 100 has a multigap structure in which the thickness of the liquid crystal layer 4 is optimized in both the reflective display region E1 and the transmissive display region E2. Accordingly, a high-quality display image can be achieved in both transmissive display and reflective display.

[Manufacturing Method for Liquid Crystal Display Device 100]

Figure 10:
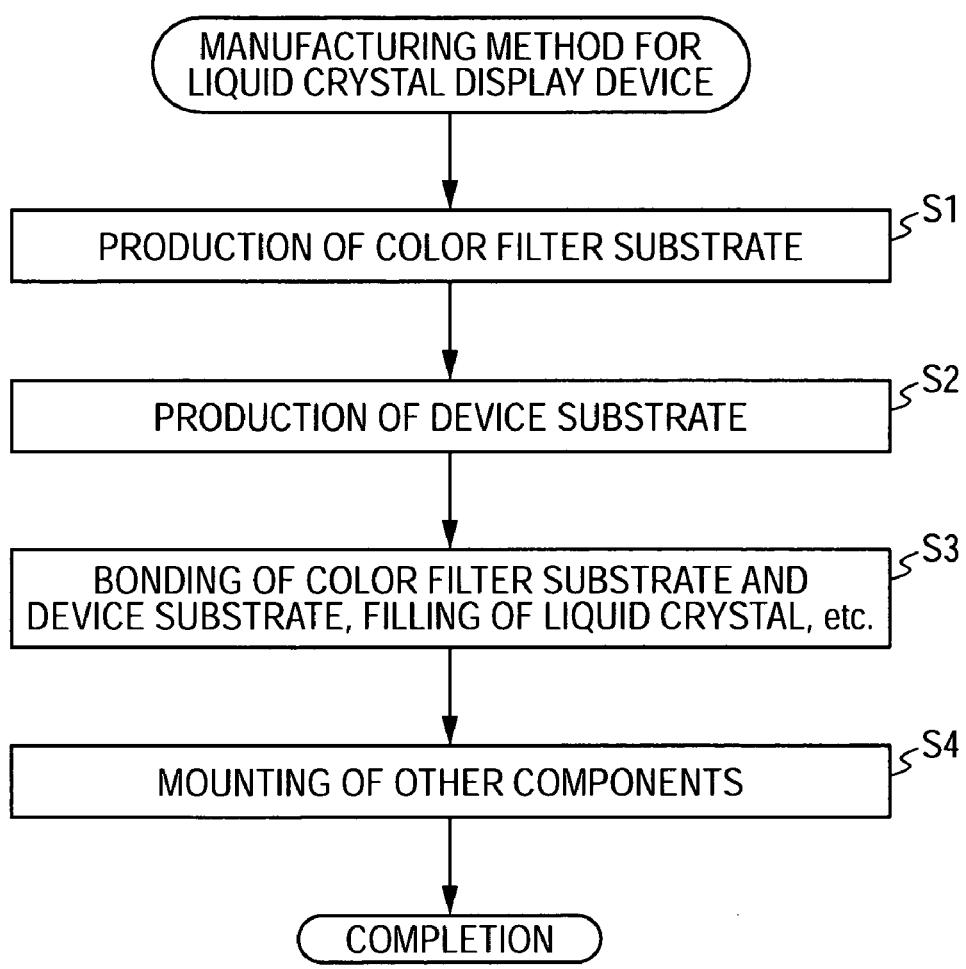
FIG. 10 is a flowchart showing a manufacturing method for the liquid crystal display device of the invention.

A manufacturing method for the liquid crystal display device 100 of the embodiment will now be described with reference to FIGS. 10 to 14. FIG. 10 is a flowchart showing the manufacturing method for the liquid crystal display device 100.

A color filter substrate 91 shown in FIGS. 2 and 3 is first produced in a known manner (Step S1). In this case, photospacers are formed on transparent electrodes 8 by a known method correspondingly to reflecting display regions E1 (shown by broken lines) provided in a completed panel structure of the liquid crystal display device 100.

Figure 11:
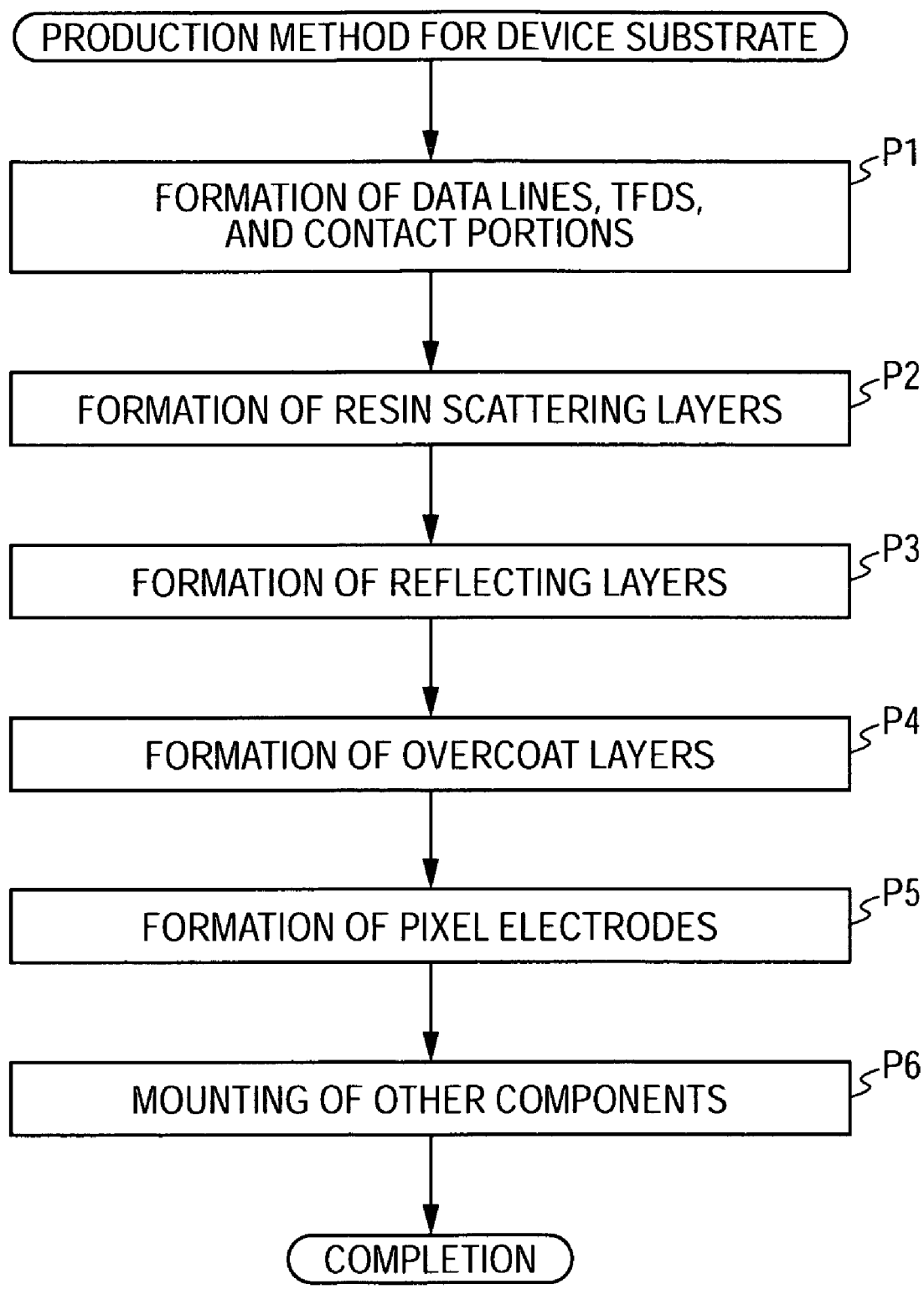
FIG. 11 is a flowchart showing a production method for the device substrate in the embodiment.

A device substrate 92, which is a characteristic part of the invention, is produced (Step S2). FIG. 11 is a flowchart showing a production method for the device substrate 92. FIG. 12A, 12B, 13A, 13B, 14A, and 14B are plan views corresponding to Steps P1 to P5 in FIG. 11. Since FIGS. 14A and 14B correspond to FIG. 6, FIG. 8 should be referred to in order to grasp the corresponding sectional structure in the description of the production steps shown in FIGS. 12 to 14. Since the reflective display region E1, the transmissive display region E2, the shielding region E3, and the contact region E4 are not shown in FIGS. 13 and 14 for convenience, FIGS. 12A and 12B should be appropriately referred to in order to know the positional relationship among the regions.

Figure 12A:
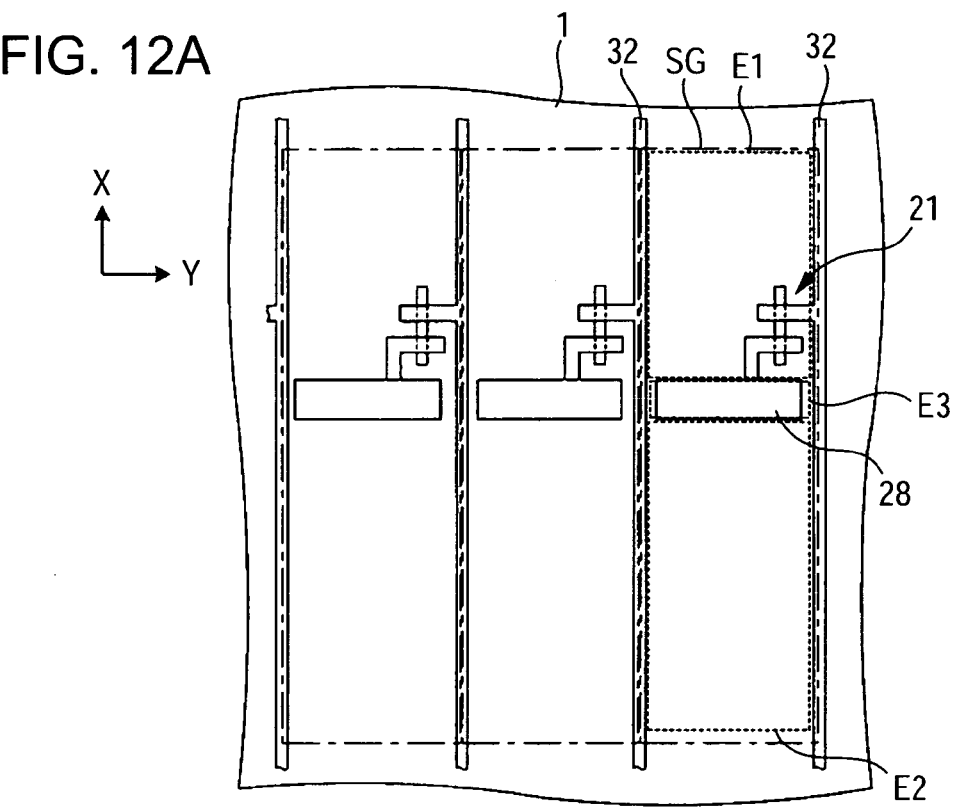
FIGS. 12A and 12B are plan views corresponding to production steps for the device substrate shown in FIG. 11.

A description will be given of the production method for the device substrate 92. Data lines 32, TFDs 21, and shielding conductive films 28 are formed on a lower substrate 1 made of, for example, glass or plastic (Step P1). More specifically, the data lines 32 are arranged at appropriate intervals so as to extend in the X-direction. The TFDs 21 are formed correspondingly to reflective display regions E1. The shielding conductive films 28 are formed correspondingly to regions between transmissive display regions E2 (shown by broken lines) and the reflective display regions E1, that is, to shielding region E3 (shown by broken lines). FIG. 12A shows a state in which the data lines 32, the TFDs 21, and the shielding conductive films 28 are provided on the lower substrate 1.

Figure 12B:
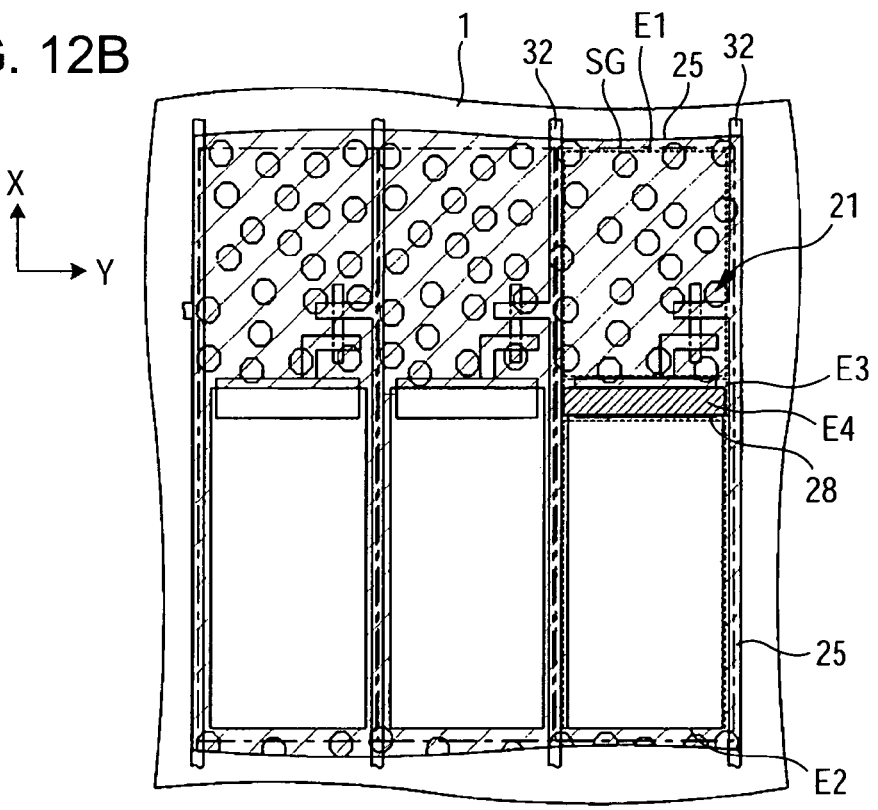

Next, resin scattering layers 25 are formed (Step P2). More specifically, for example, photosensitive acrylic resin is applied in a uniform thickness of approximately 1.2 μm to 1.3 μm on the lower substrate 1, the data lines 32, the TFDs 21, and the shielding conductive films 28, and is then subjected to exposure, development, and patterning, thereby forming multiple fine surface irregularities. A portion of a resin scattering layer 25 applied in each transmissive display region E2 and a part of each shielding region E3 is removed. In this case, the peripheral portion of the resin scattering layer 25 is tapered, and at least a portion of the resin scattering layer 25 formed in the region E4 of the shielding conductive film 28 (hatched region) is removed. FIG. 12B shows a state in which the resin scattering layers 25 are provided.

Figure 13A:
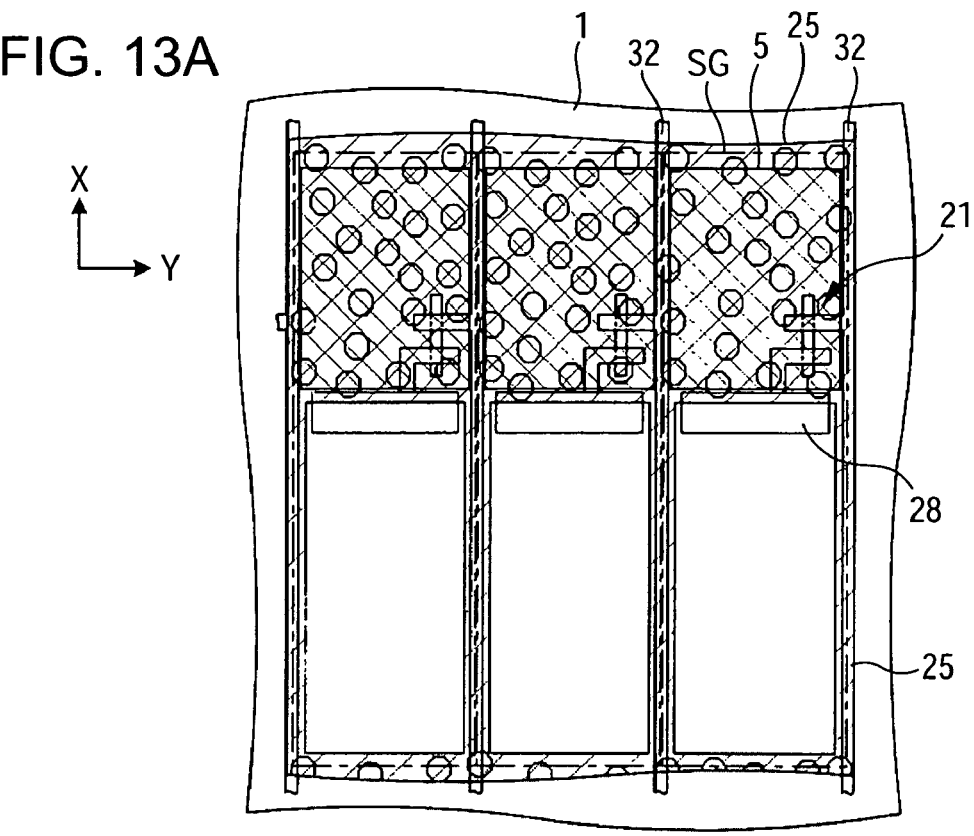
FIGS. 13A and 13B are plan views corresponding to production steps for the device substrate shown in FIG. 11.

Subsequently, reflecting layers 5 are formed (Step P3). More specifically, a thin metal film made of, for example, aluminum, an aluminum alloy, or a silver alloy, is formed by evaporation, sputtering, or other methods on the resin scattering layers 25 in the reflective display regions E1. By patterning the metal thin film by photolithography, substantially rectangular reflecting layers 5 are formed. The reflecting layers 5 reflect the fine irregularities of the resin scattering layers 25. FIG. 13A shows a state in which the reflecting layers 5 are provided on the resin scattering layers 25 corresponding to the reflective display regions E1.

Figure 13B:
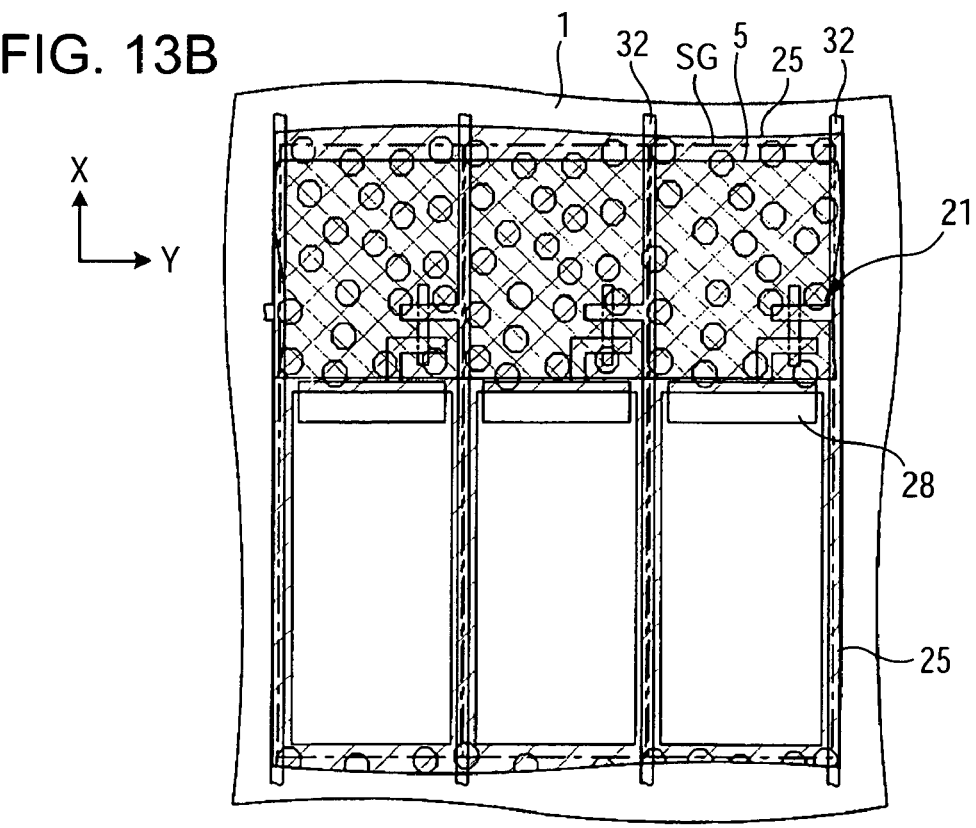

Instead of forming the substantially rectangular reflecting layers 5 on the resin scattering layers 25 in the reflective display regions E1 correspondingly to respective sub-pixels SG, as described above, a stripe-shaped continuous reflecting layer may be formed on the resin scattering layers 25 so as to cover a plurality of adjacent sub-pixel regions SG in the reflective display regions E1, as shown in FIG. 13B.

Figure 14A:
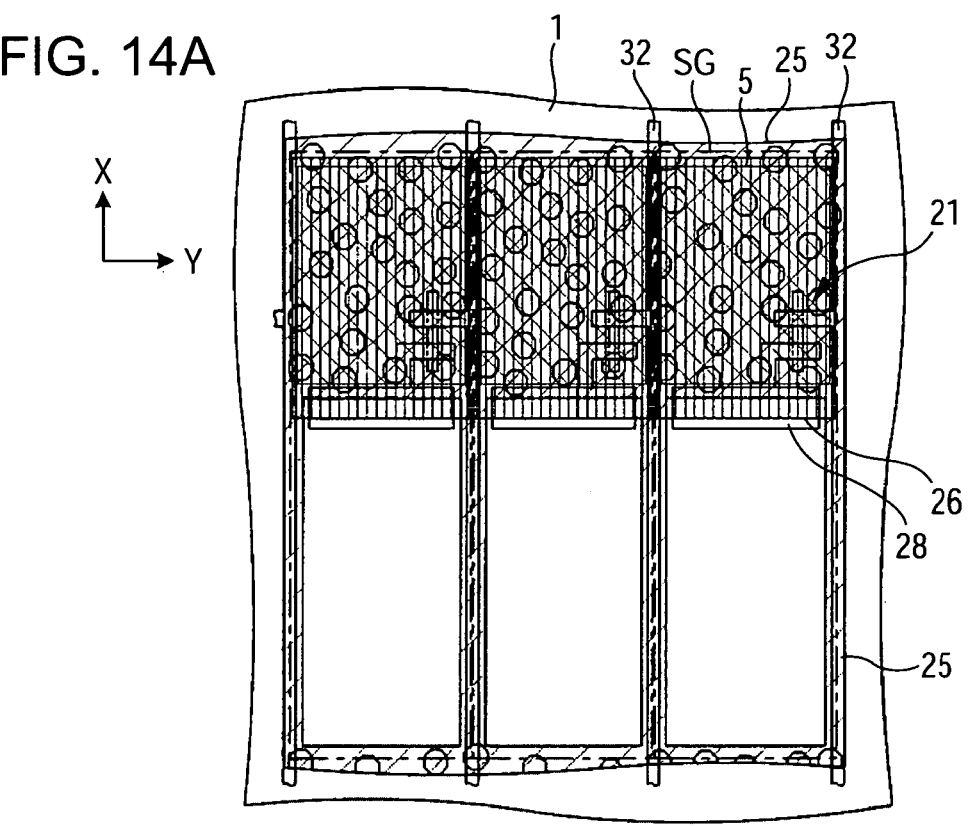
FIGS. 14A and 14B are plan views corresponding to production steps for the device substrate shown in FIG. 11.

Next, overcoat layers 26 are formed (Step P4). More specifically, for example, photosensitive acrylic resin is applied in a uniform thickness on the shielding conductive films 28 outside the regions E4 and on the resin scattering layers 25 and the reflecting layers 5 in the reflective display regions E1, and is then exposed and developed in a predetermined pattern, thus forming overcoat layers 26. In this case, a peripheral portion of each of the overcoat layers 26 is tapered. By forming the overcoat layers 26 on the reflecting layers 5, trouble, for example, peeling of the edges of the reflecting layers 5, can be prevented during the production process. Moreover, by forming the overcoat layers 26 in a predetermined thickness, a desired multigap structure can be formed in cooperation with the resin scattering layers 25. That is, the thickness of the liquid crystal layer 4 in the reflective display regions E1 can be set at a predetermined thickness smaller than the thickness in the transmissive display regions E2 in the completed panel structure of the liquid crystal display device 100. FIG. 14A shows a state in which the overcoat layers 26 are provided on the reflecting layers 5 and so on.

Figure 14B:
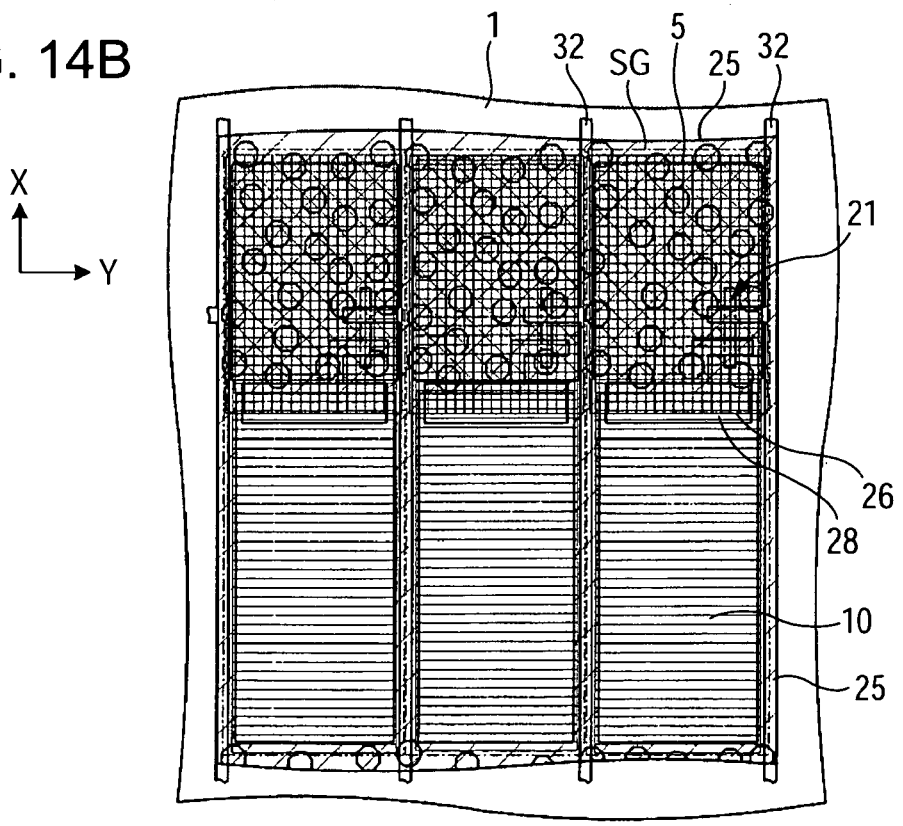

Next, pixel electrodes 10 are formed (Step P5). More specifically, for example, transparent electrodes made of ITO are formed in the shape of a thin film by sputtering in sub-pixels SG, that is, on the lower substrate 1 in the transmissive display regions E2, on the portions of the shielding conductive films 28 corresponding to the region E4, and on the portions of the overcoat layers 26 corresponding to the shielding regions E3 and the reflective display regions E1, so that substantially rectangular pixel electrodes 10 are formed. Consequently, the pixel electrodes 10 and the shielding conductive films 28 are connected in the regions E4. FIG. 14B shows a state in which the pixel electrodes 10 are provided in the sub-pixels SG.

Next, other components, namely, a retardation film 13, a polarizing plate 14, and a backlight 15 are mounted (Step P6). In this procedure, the device substrate 92 shown in FIGS. 2 to 4 is produced.

Referring again to FIG. 10, the device substrate 92 and the color filter substrate 91 are bonded with the seal member 3 disposed therebetween, liquid crystal is filled through an opening (not shown) of the seal member 3, and the opening is closed by a sealing material such as ultraviolet curing resin (Step S3). The device substrate 92 and the color filter substrate 91 are thereby bonded with almost the prescribed space therebetween. That is, a multigap structure is formed in which the thickness of the liquid crystal layer 4 is set at D2 in the transmissive display regions E2 and at D1 (<D2) in the reflective display regions E1.

Other components are then mounted, and the liquid crystal display device 100 shown in FIGS. 1 to 3 is completed.

[Modifications]

Figure 15A:
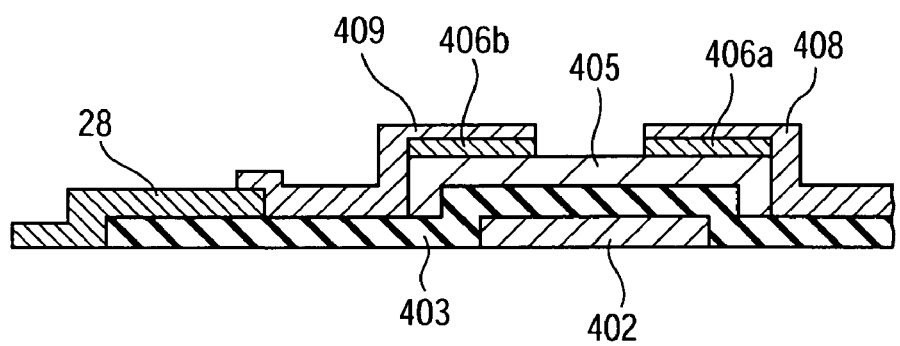
FIGS. 15A and 15B are explanatory views showing an example of an application to a liquid crystal display device having a TFT.

While the TFDs (thin-film diodes) 21 are used as active elements in the above embodiment, the invention is not limited to the embodiment. That is, the TFDs 21 may be replaced with amorphous TFTs serving as active elements. FIG. 15A is a cross-sectional view of an amorphous TFT, and FIG. 15B is an enlarged sectional view of a region E10 shown by a broken line in FIG. 8 when the amorphous TFT is applied to the liquid crystal display device 100 of the embodiment.

In a TFT 450, a gate insulating film 403 is provided to cover a gate electrode 402 that diverges from an unshown gate line, as shown in FIG. 15A. An a-Si layer 405 is provided on the gate insulating film 403 correspondingly to the gate electrode 402. Two separate $n^+$-a-Si layers 406a and 406b are provided on the a-Si layer 405. A source electrode 408 that diverges from an unshown source line is provided on the $n^+$-a-Si layer 406a, and a drain electrode 409 is provided on the $n^+$-a-Si layer 406b. A shielding conductive film 28 overlaps with the drain electrode 409.

Figure 15B:
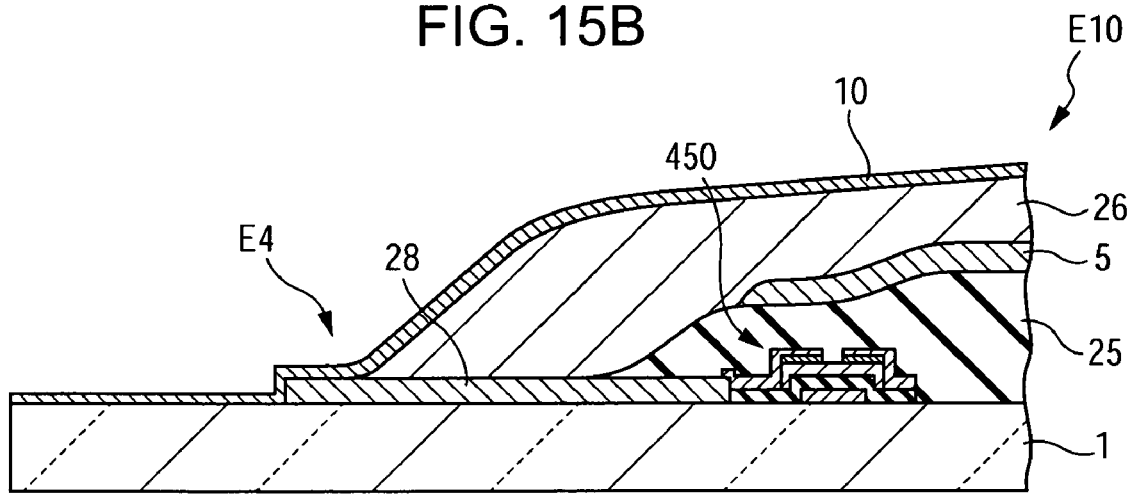

The invention is also applicable to a connecting portion between the drain electrode 409 and the shielding conductive film 28 in the above amorphous TFT 450 serving as an active element, as shown in FIG. 15B. The TFT 450 is electrically connected to the pixel electrode 10 and the data line 32 via the shielding conductive film 28.

While the substantially rectangular reflecting layer 5 is provided in the reflective display region E1 corresponding to each sub-pixel SG in the device substrate 92 of the above embodiment, reflecting layers may be arranged in stripes so as to extend on the resin scattering layers 25 in reflective display regions of a plurality rows of sub-pixels SG, as shown in FIG. 13B.

[Electronic Apparatuses]

A description will now be given of another embodiment of the invention in which the above-described liquid crystal display device 100 is used as a display section of an electronic apparatus.

Figure 16:
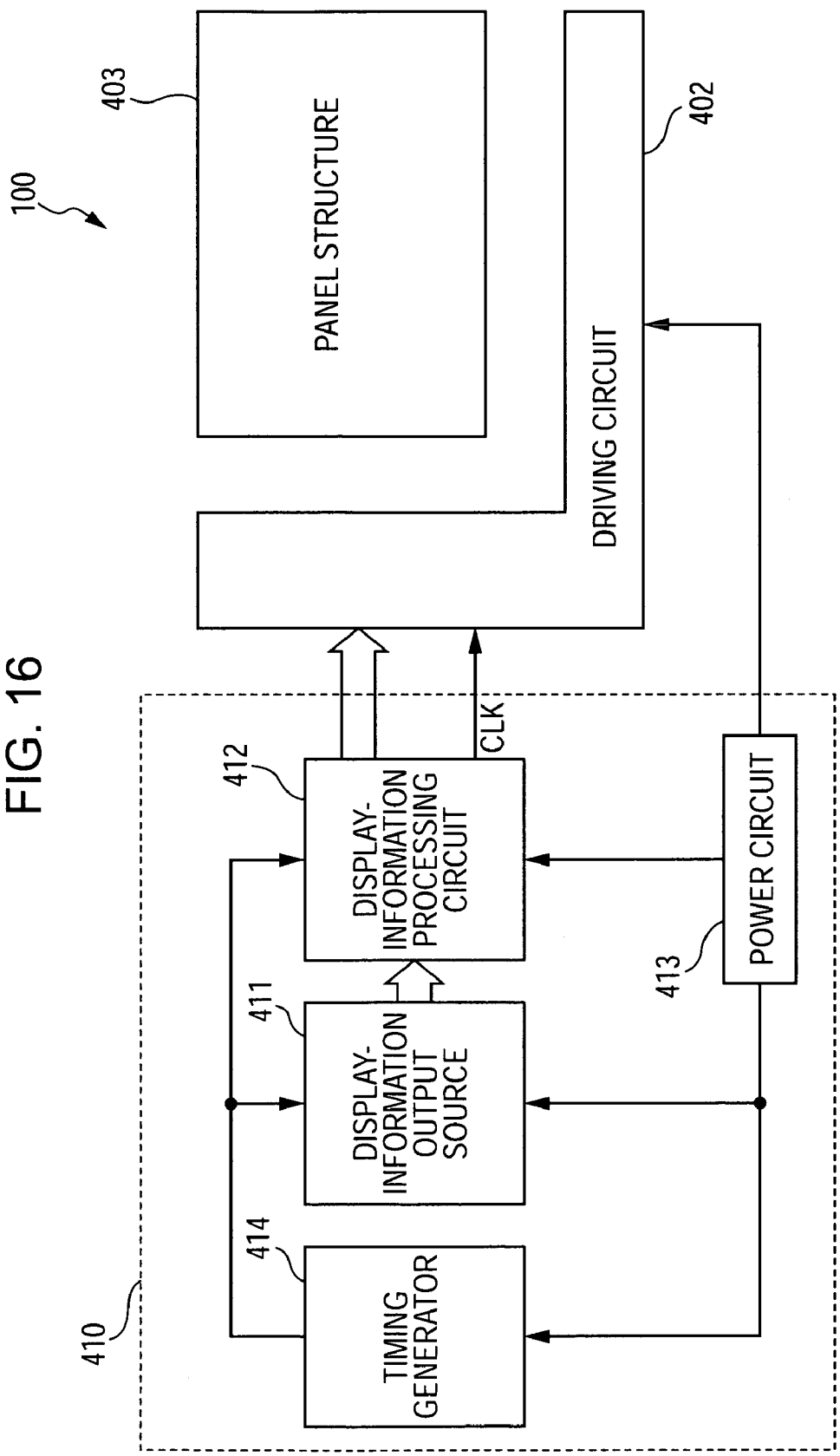
FIG. 16 is a circuit block diagram of an electronic apparatus to which the liquid crystal display device of the embodiment is applied.

FIG. 16 is a schematic structural view showing the overall configuration of an electronic apparatus according to this embodiment. The electronic apparatus includes the above-described liquid crystal display device 100, and a control unit 410 for controlling the liquid crystal display device 100. Herein, the liquid crystal display device 100 is conceptually separated into a panel structure 403, and a driving circuit 402 such as a semiconductor IC. The control unit 410 includes a display-information output source 411, a display-information processing circuit 412, a power circuit 413, and a timing generator 414.

The display-information output source 411 includes a memory such as a ROM (read only memory) or a RAM (random access memory), a storage unit such as a magnetic recording disc or an optical recording disc, and a tuning circuit for synchronously outputting digital image signals. The display-information output source 411 supplies display information, for example, as image signals in a predetermined format to the display-information processing circuit 412 in response to various clock signals generated by the timing generator 414.

The display-information processing circuit 412 includes various known circuits such as a serial-parallel conversion circuit, an amplifying/inverting circuit, a rotation circuit, a gamma correction circuit, and a clamp circuit. The display-information processing circuit 412 processes input display image information, and feeds the information to the driving circuit 402 with a clock signal CLK. The driving circuit 402 includes a scanning-line driving circuit, a data-line driving circuit, and an inspection circuit. The power circuit 413 feeds a predetermined voltage to the above components.

Specific examples of electronic apparatuses to which the liquid crystal display device 100 of the embodiment is applicable will be described with reference to FIGS. 17A and 17B.

Figure 17A:
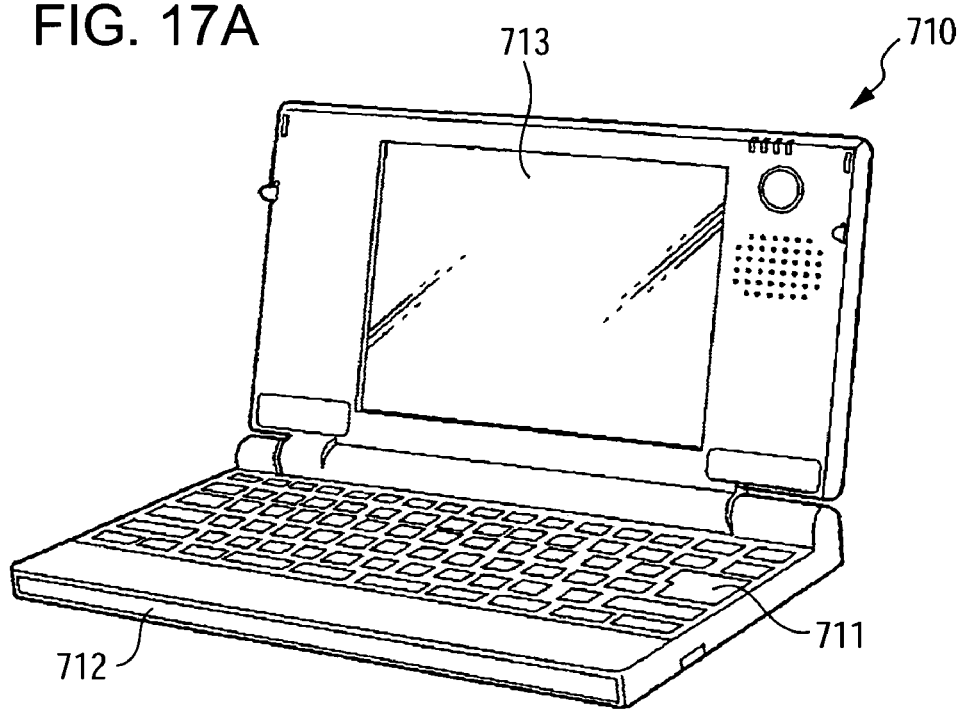
FIGS. 17A and 17B are explanatory views of examples of electronic apparatuses to which the liquid crystal display device of the embodiment is applied.

FIG. 17A is a perspective view of a portable personal computer (so-called notebook personal computer) in which the liquid crystal display device 100 is applied as a display section. As shown in FIG. 17A, a personal computer 710 includes a main unit 712 having a keyboard 711, and a display unit 713 to which the liquid crystal display device 100 is applied.

Figure 17B:
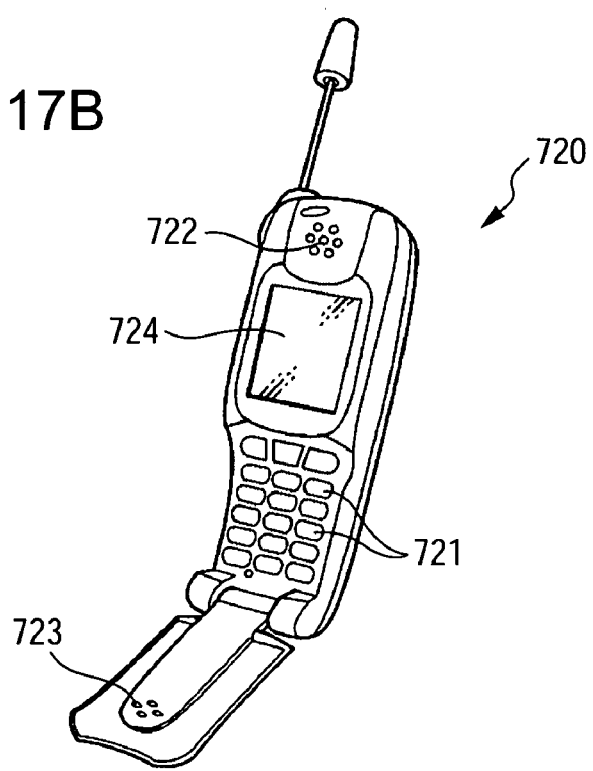

FIG. 17B is a perspective view of a mobile telephone in which the liquid crystal display device 100 of the embodiment is applied as a display section. As shown in FIG. 17B, a mobile telephone 720 includes a plurality of control buttons 721, an earpiece 722, a mouthpiece 723, and a display 724 to which the liquid crystal display device 100 is applied.

Besides the personal computer 710 shown in FIG. 17A and the mobile telephone 720 shown in FIG. 17B, the liquid crystal display device 100 of the embodiment may be applied to various electronic apparatuses such as a liquid crystal television, view-finder and direct-monitor-view video tape recorders, a car navigation system, a pager, an electronic notebook, an electronic desk calculator, a word processor, a workstation, a videophone, a POS terminal, and a digital still camera.

The invention is applicable not only to liquid crystal display devices, but also to various other electrooptical devices, for example, an organic or inorganic electroluminescence device, a plasma display device, an electrophoretic display device, and a device utilizing an electron emitter (a field emission display or a surface-conduction electron-emitter display).

What is claimed is:

1. A liquid crystal device comprising:
a device substrate having a switching element;
a counter substrate having a color layer; and
a liquid crystal layer provided between the device substrate and the counter substrate,
wherein the device substrate includes:
a substrate;
a sub-pixel including a reflective display region and a transmissive display region;
a switching element;
a conductive film connected to the switching element;
a scattering layer that covers a part of the conductive film and the switching element;
a reflecting layer provided on a part of the scattering layer;
an overcoat layer that covers a part of the conductive film, the scattering layer, and the reflecting layer, the overcoat layer including a sloping section that slopes toward the substrate so that thickness of the overcoat gradually reduces to an edge portion of the overcoat layer located at a position between the reflective display region and the transmissive display region of the sub-pixel; and
a pixel electrode provided on the overcoat layer, the pixel electrode being connected to a contact portion of the conductive film that extends beyond the scattering layer and beyond the edge portion of the sloping section of the overcoat layer.

2. The liquid crystal device according to claim 1, wherein the pixel electrode is provided in the transmissive region.

3. The liquid crystal device according to claim 1, wherein the conductive film shields light.

4. The liquid crystal device according to claim 3, wherein the conductive film is provided between the transmissive region and the reflective region in the sub-pixel.

5. The liquid crystal device according to claim 1, wherein a data line is provided on the device substrate, and is isolated from the pixel electrode by the scattering layer.

6. The liquid crystal device according to claim 1, wherein the switching element is provided on the device substrate so as to be aligned with the reflecting layer.

7. The liquid crystal device according to claim 1, wherein a columnar photospacer is provided on the counter substrate correspondingly to a reflective region when the device substrate and the counter substrate are bonded, and the thickness of the liquid crystal layer in the reflective region is smaller than the thickness of the liquid crystal layer in a transmissive region.

8. A liquid crystal device comprising:
a device substrate having a switching element;
a counter substrate having a color layer; and
a liquid crystal layer provided between the device substrate and the counter substrate,
wherein the device substrate includes:
a substrate;
a sub-pixel including a reflective display region and a transmissive display region;
a switching element;
a conductive film connected to the switching element;
an overcoat layer that covers a part of the conductive film, the overcoat layer including a sloping section that slopes toward the substrate so that thickness of the overcoat gradually reduces to an edge portion of the overcoat layer corresponding to a boundary between the reflective display region and the transmissive display region of the sub-pixel and a pixel electrode provided on the overcoat layer, the pixel electrode being connected to a contact portion of the conductive film that extends beyond the edge portion of the sloping section of the overcoat layer.

9. The liquid crystal device according to claim 8, wherein the conductive film is provided between the transmissive region and the reflective region in the sub-pixel and the conductive film shields light.

* * * * *